(12) United States Patent
Thompson et al.

(10) Patent No.: US 11,993,109 B2
(45) Date of Patent: May 28, 2024

(54) WHEEL COMPRISING A NON-PNEUMATIC TIRE

(71) Applicant: CAMSO INC., Magog (CA)

(72) Inventors: Ronald H. Thompson, Greenville, SC (US); Stephan Tremblay, Magog (CA)

(73) Assignee: Camso Inc., Magog (CA)

( * ) Notice: Subject to any disclaimer, the term of this patent is extended or adjusted under 35 U.S.C. 154(b) by 650 days.

(21) Appl. No.: 16/956,996

(22) PCT Filed: Dec. 21, 2018

(86) PCT No.: PCT/CA2018/051658
§ 371 (c)(1),
(2) Date: Jun. 22, 2020

(87) PCT Pub. No.: WO2019/119155
PCT Pub. Date: Jun. 27, 2019

(65) Prior Publication Data
US 2020/0331221 A1    Oct. 22, 2020

Related U.S. Application Data

(60) Provisional application No. 62/608,979, filed on Dec. 21, 2017.

(51) Int. Cl.
*B60C 7/00* (2006.01)
*B29D 30/02* (2006.01)
(Continued)

(52) U.S. Cl.
CPC .............. *B60C 7/143* (2013.01); *B29D 30/02* (2013.01); *B29D 30/0678* (2013.01);
(Continued)

(58) Field of Classification Search
CPC .... B29D 30/02; B29D 30/0678; B60C 7/107; B60C 7/143; B60C 7/146; B60C 2007/005; B29C 45/00
(Continued)

(56) References Cited

U.S. PATENT DOCUMENTS 4,201,744 A      5/1980   Makinson
2008/0237929 A1*  10/2008  Sher ...................... B29C 45/006
                                                            264/326
(Continued)

FOREIGN PATENT DOCUMENTS

CA            2976055 A1        8/2016
DE       102014221111 A1 *      4/2016
(Continued)

OTHER PUBLICATIONS

Kreidner H, DE-102014221111-A1, machine translation. (Year: 2016).*

(Continued)

*Primary Examiner* — Sedef E Paquette
(74) *Attorney, Agent, or Firm* — Hahn Loeser & Parks LLP; Bret A. Hrivnak

(57) ABSTRACT

A wheel for a vehicle in which the wheel comprises a non-pneumatic tire that may be designed for robust, long-lasting performance in challenging conditions, including by using a process to make the non-pneumatic tire that may be specified such that a material of the non-pneumatic tire retains most or all of its inherent capabilities. For example, (Continued)

an annular beam and an annular support of the non-pneumatic tire may be injection molded together from elastomeric material flowing first where at least part of the annular beam is before flowing where at least part of the annular support is (e.g., using a molding apparatus that comprises a mold including a mold cavity and outer gating to inject thermoplastic material at an outer part of the mold into the mold cavity adjacent to where the annular beam is to be formed).

36 Claims, 22 Drawing Sheets

(51) Int. Cl.
    *B29D 30/06*     (2006.01)
    *B60C 7/14*     (2006.01)
    *B60C 7/10*     (2006.01)

(52) U.S. Cl.
    CPC ........ *B60C 2007/005* (2013.01); *B60C 7/107* (2021.08); *B60C 7/146* (2021.08)

(58) Field of Classification Search
    USPC .......................................... 152/323; 156/112
    See application file for complete search history.

(56) References Cited

U.S. PATENT DOCUMENTS

| | | | |
|---|---|---|---|
| 2014/0070448 A1* | 3/2014 | Martin | B29D 30/02 264/161 |
| 2014/0159280 A1* | 6/2014 | Martin | B29C 33/76 425/470 |
| 2014/0367007 A1 | 12/2014 | Thompson | |
| 2016/0031137 A1 | 4/2016 | Wilson | |
| 2017/0120680 A1* | 5/2017 | Takahashi | B60C 11/00 |

FOREIGN PATENT DOCUMENTS

| | | |
|---|---|---|
| EP | 2910387 A1 | 10/2013 |
| WO | 2017040390 A1 | 3/2017 |
| WO | 2017106662 A1 | 6/2017 |
| WO | 2017116384 A1 | 7/2017 |
| WO | 2018111339 A1 | 6/2018 |

OTHER PUBLICATIONS

International Search Report dated Feb. 12, 2019.
Supplementary European Search Report dated Oct. 20, 2020.
Design Guide for Hytrel pp. 47-48.

* cited by examiner

WHEEL COMPRISING A NON-PNEUMATIC TIRE

CROSS-REFERENCE TO RELATED APPLICATION

This application claims priority from U.S. Provisional Patent Application 62/608,979 filed on Dec. 21, 2017 and incorporated by reference herein.

FIELD

This disclosure relates to non-pneumatic tires (NPTs) for vehicles (e.g., agricultural vehicles such as riding lawn mowers; recreational vehicles such as all-terrain vehicles; automobiles and other road vehicles; etc.), including to processing parameters related to molding NPTs.

BACKGROUND

Non-pneumatic tires (NPTs) have advantages over pneumatic tires because they cannot fail due to air pressure loss. Particularly, NPTs that transmit loads from a contact patch to a central hub via tension forces show promise for being able to function similarly to pneumatic tires, while maintaining flat-free performance.

A tension-based NPT has been disclosed that may employ a simple production process. U.S. Pat. No. 9,751,270, incorporated herein in its entirely, discloses a NPT that may not comprise reinforcement, such as cables, cords, or the like. Instead, geometries are disclosed that may enable a composite-like response of a structure that can be constructed from isotropic materials, including elastomers. As such, in some cases, thermoplastic injection may be used to form all or part of the structure.

U.S. Patent Application Ser. No. 62/520,227 discloses material and geometry aspects of an NPT which may efficiently withstand cyclic tension stresses. This may be particularly important at a radially-inward surface of an annular beam of the NPT, which is configured to deflect at the contact patch. To withstand cyclic tension stresses, this region comprises a material which has adequate crack propagation resistance. However, this may not be sufficient in some cases. The material may be formed (i.e., molded) in such a way that defects may occur in the material. These defects may include initial cracks, zones of poor bonding, or microscopic imperfections due to processing that may lead to a significant reduction in capabilities inherent in the material itself.

Thermoplastic injection may sometimes give rise to a phenomenon of so-called "weld lines." This is a line formed where two mold flow fronts meet. If mold front temperatures are too low, an area having a weld line may cause a locally weak area in a molded part. When mold front temperatures are too low, the mold fronts may not adequately bond together, thereby creating local reductions in strength. A weld line of reduced strength may not be visually detectible, making this imperfection even more problematic.

Weld line strength in thermoplastic injection relates to many things. These include: molding machine barrel temperature, material back pressure, injection speed, gate location, gating length, and mold temperature. Depending on a part's function, geometry, and material, process engineers attempt to define these process parameters to manufacture the part that performs as designed.

Part geometries as the ones disclosed in U.S. Pat. No. 9,751,270 may be complex. This may be exacerbated by complexities of cyclic stresses in the annular beam, spokes, and hub area of the NPT disclosed in that patent.

For these and other reasons, there is a need for improvements in NPTs, including for optimization of process parameters, such as for injection molding.

SUMMARY

According to various aspects, this disclosure relates to a wheel for a vehicle in which the wheel comprises a non-pneumatic tire that may be designed for robust, long-lasting performance in challenging conditions, including by using a process to make the non-pneumatic tire that may be specified such that a material of the non-pneumatic tire retains most or all of its inherent capabilities.

For example, according to an aspect, this disclosure relates to a non-pneumatic tire. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface. The annular beam and the annular support are injection molded together from elastomeric material flowing where at least part of the annular beam is before flowing where at least part of the annular support is.

According to another aspect, this disclosure relates to a wheel comprising a non-pneumatic tire and a hub. The non-pneumatic tire comprises an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface. The annular beam and the annular support are injection molded together from elastomeric material flowing where at least part of the annular beam is before flowing where at least part of the annular support is. The hub extends radially inwardly from the annular support towards an axis of rotation of the wheel.

According to another aspect, this disclosure relates to a method of making a non-pneumatic tire. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface. The method comprises injection molding the annular beam and the annular support together from elastomeric material flowing where at least part of the annular beam is before flowing where at least part of the annular support is.

According to another aspect, this disclosure relates to a method of making a wheel comprising a non-pneumatic tire and a hub. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface; and the hub that extends radially inwardly from the annular support towards an axis of rotation of the wheel. The method comprises injection molding the annular beam and at least part of the annular support together from elastomeric material flowing where at least part of the annular beam is before flowing where at least part of the annular support is; and injection molding the hub and at least part of the annular support together from elastomeric material flowing from where at least part of the hub is before flowing where at least part of the annular support is.

According to another aspect, this disclosure relates to a molding apparatus for making a non-pneumatic tire. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface. The molding apparatus comprises: a mold cavity to form the annular beam and the annular support; and outer gating to inject elastomeric material in the mold cavity adjacent to where the annular beam is to be formed in order to injection mold the annular beam and the annular support together.

According to another aspect, this disclosure relates to a molding apparatus for making a wheel comprising a non-pneumatic tire and a hub. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface. The hub extends radially inwardly from the annular support towards an axis of rotation of the wheel. The molding apparatus comprises: a mold cavity to form the annular beam, the annular support and the hub; outer gating to inject elastomeric material in the mold cavity adjacent to where the annular beam is to be formed in order to injection mold the annular beam and the annular support together; and central gating to inject elastomeric material in the mold cavity adjacent to where the hub is to be formed in order to injection mold the hub and the annular support together.

According to another aspect, this disclosure relates to a non-pneumatic tire. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface; wherein the annular beam and the annular support are injection molded together using a mold comprising outer gating to inject the elastomeric material into the mold adjacent to where the annular beam is to be formed.

According to another aspect, this disclosure relates to a non-pneumatic tire. The non-pneumatic tire comprises: an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface; wherein an outer peripheral extent of the annular beam contains a plurality of injection-molding-gate marks.

According to another aspect, this disclosure relates to a non-pneumatic tire comprising an annular beam, with an annular support extending radially inward from the annular beam. The annular beam is configured to deflect when the tire rolls on a contact surface. A thermoplastic injection process is used to form the annular beam and annular support. The injection gate locations are chosen such that strength reductions due to weld lines near the radially inward surface of the annular beam are minimized.

According to another aspect, this disclosure relates to a non-pneumatic tire comprising an annular beam, with an annular support extending radially inward from the annular beam. The annular beam is configured to deflect when the tire rolls on a contact surface. A thermoplastic injection process is used to form the annular beam and annular support. The injection gates include at least one gate located on the annular beam.

According to another aspect, this disclosure relates to a non-pneumatic tire comprising an annular beam, with an annular support extending radially inward from the annular beam. The annular beam is configured to deflect when the tire rolls on a contact surface. A thermoplastic injection process is used to form the annular beam and annular support. Multiple injection gates are located on a radially outer surface of the annular beam, and are substantially placed evenly around the beam circumference.

According to another aspect, this disclosure relates to a non-pneumatic tire comprising an annular beam, with an annular support extending radially inward from the annular beam, connecting the annular beam to a hub portion. The hub portion includes a metal portion designed to house bearings and an axle, for use with a vehicle. The annular beam is configured to deflect when the tire rolls on a contact surface. A thermoplastic injection process is used to form the annular beam, annular support, and hub portion. Multiple injection gates are located on a radially outer surface of the annular beam, and are substantially placed evenly around the beam circumference. The so-formed non-pneumatic tire may then be used in a secondary operation, in which a tread portion is molded or otherwise adhered to the radially outward surface of the annular beam.

These and other aspects of this disclosure will now become apparent to those of ordinary skill in the art upon review of a description of embodiments in conjunction with accompanying drawings.

BRIEF DESCRIPTION OF THE DRAWINGS

A detailed description of embodiments is provided below, by way of example only, with reference to accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
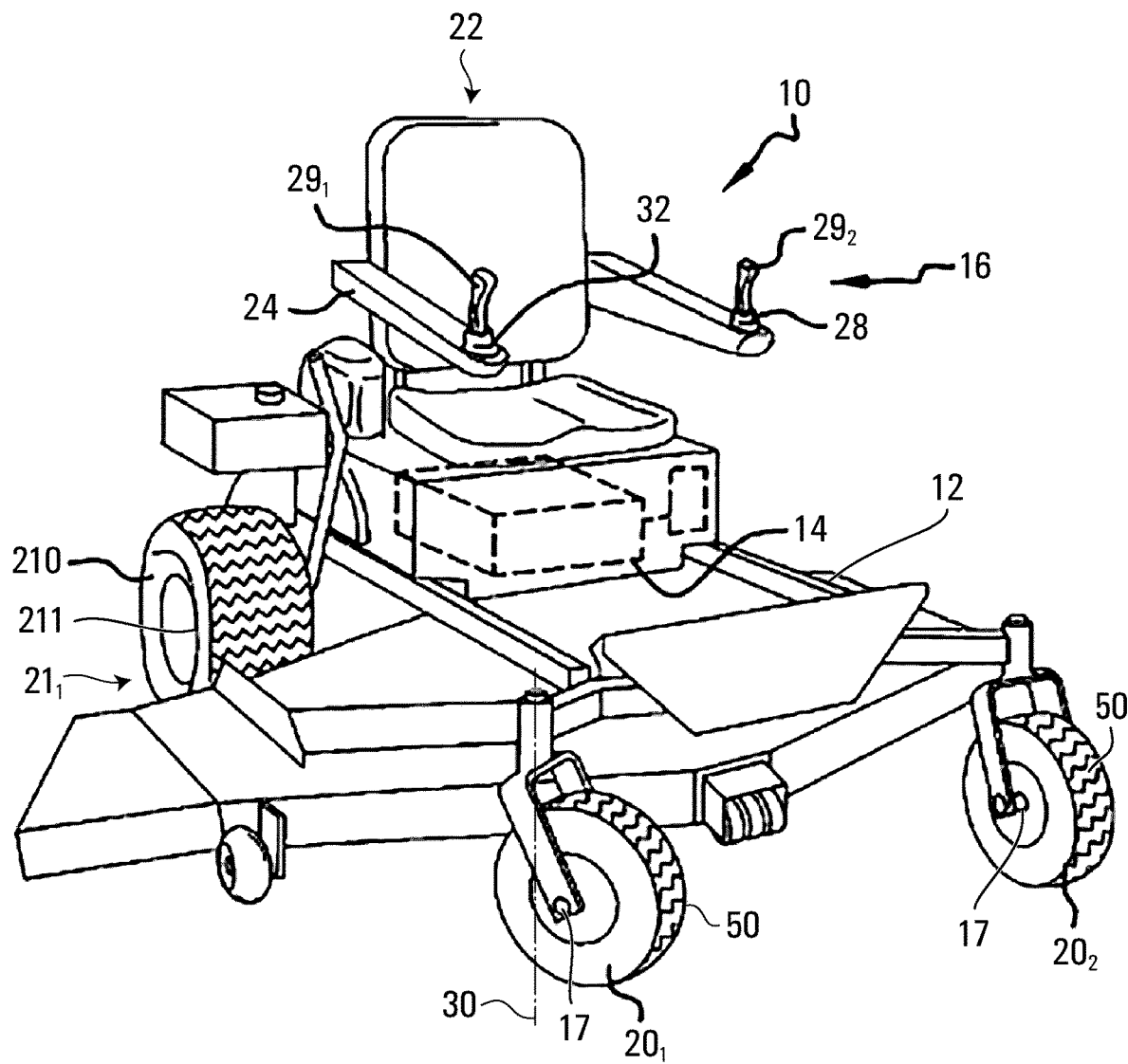
FIG. 1 shows a side-elevation view of an example of an embodiment of a vehicle comprising caster wheels, in which the vehicle is a zero-turning-radius (ZTR) lawn mower.

FIG. 1 show an example of a vehicle 10 comprising wheels $20_1$, $20_2$ in accordance with an embodiment. In this embodiment, the vehicle 10 is a riding lawnmower to mow lawn. More particularly, in this embodiment, the riding lawnmower 10 is a zero-turning-radius (ZTR) mower (a.k.a., zero-turn mower) and the wheels $20_1$, $20_2$ are caster wheels in the front of the ZTR mower 10. The ZTR mower 10 is configured to turn with a substantially zero turning radius, i.e., turn a full 360 degrees with substantially no forward or backward movement. In this example, the ZTR mower 10 comprises a frame 12, a powertrain 14, a steering system 16, the caster wheels $20_1$, $20_2$, wheels $21_1$, $21_2$ in a rear of the ZTR mower 10, a mowing implement 18, a seat 22, and a user interface 24, which enable a user of the ZTR mower 10 to ride it on the ground and mow the lawn. The ZTR mower 10 has a longitudinal direction, a widthwise direction, and a height direction.

In this embodiment, as further discussed later, the wheels 201-204 are non-pneumatic (i.e., airless) and may be designed to enhance their use and performance, including, for example, to be able to be used longer and/or in more challenging conditions, such as, for instance, by being more resistant to cracking or other damage which could lead to premature failure (e.g., due to manufacturing artifacts and/or rocks and other hazards that can cut, chip, or tear them during use), notably by making the wheels 201-204 using a thermoplastic injection process that is enhanced, such as by injecting material at an outer area of each of the wheels 201-204.

The powertrain 14 is configured for generating motive power and transmitting motive power to the wheels $21_1$, $21_2$ to propel the ZTR mower 10 on the ground. To that end, the powertrain 14 comprises a prime mover 26, which is a source of motive power that comprises one or more motors. For example, in this embodiment, the prime mover 26 comprises an internal combustion engine. In other embodiments, the prime mover 26 may comprise another type of motor (e.g., an electric motor) or a combination of different types of motor (e.g., an internal combustion engine and an electric motor). The prime mover 26 is in a driving relationship with the wheels $21_1$, $21_2$. That is, the powertrain 14 transmits motive power generated by the prime mover 26 to the wheels $21_1$, $21_2$ (e.g., via a transmission and/or a differential) in order to drive (i.e., impart motion to) the wheels $21_1$, $21_2$. In that sense, the wheels $21_1$, $21_2$ may be referred to as "drive wheels".

The steering system 16 is configured to enable the user to steer the ZTR mower 10 on the ground. To that end, the steering system 16 comprises a steering device 28 that is part of the user interface 24 and operable by the user to direct the ZTR mower 10 on the ground. In this embodiment, the steering device 28 comprises a pair of handles $29_1$, $29_2$. The steering device 28 may comprise any other steering component that can be operated by the user to steer the ZTR mower 10 in other embodiments. In this example, the steering system 16 is responsive to the user interacting with the handles $29_1$, $29_2$ by causing the powertrain 14 to apply differential power to the drive wheels $21_1$, $21_2$ to induce yaw of the ZTR mower 10 in order to turn the ZTR mower 10 to move in a desired direction. Meanwhile, the caster wheels $20_1$, $20_2$ are turnable in response to input of the user at the steering device 28 to change their orientation relative to the frame 12 of the ZTR mower 10. More particularly, in this example, each of the caster wheels $20_1$, $20_2$ is pivotable about a steering axis 30 relative to the frame 12 of the ZTR mower 10.

Figure 2A:
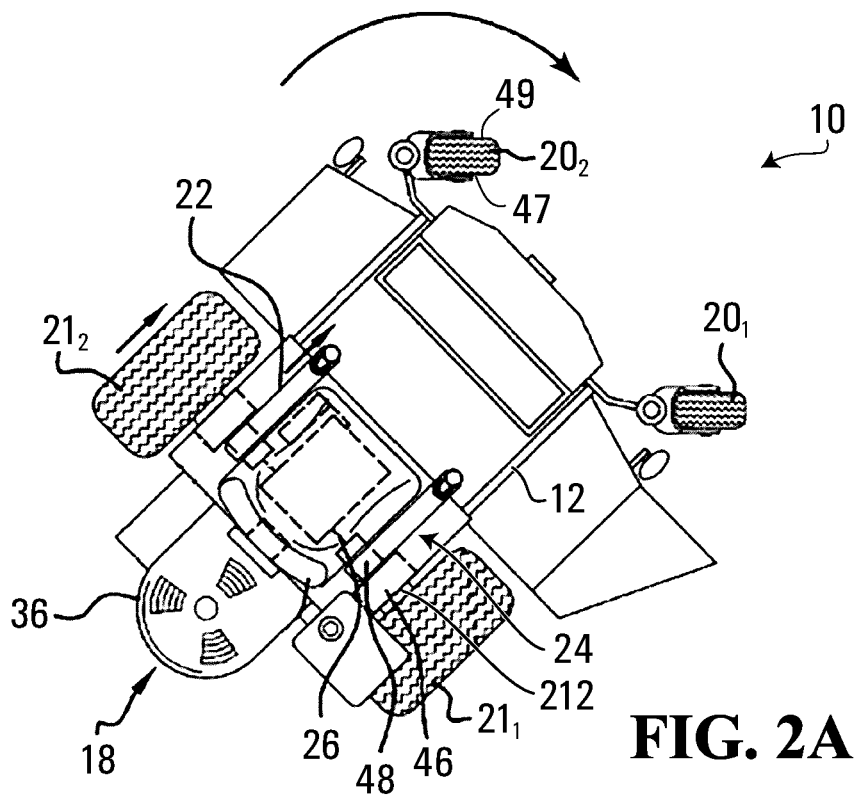
FIG. 2A shows a plan view of the vehicle of FIG. 1 with greater positive torque applied to a left rear wheel.
Figure 2B:
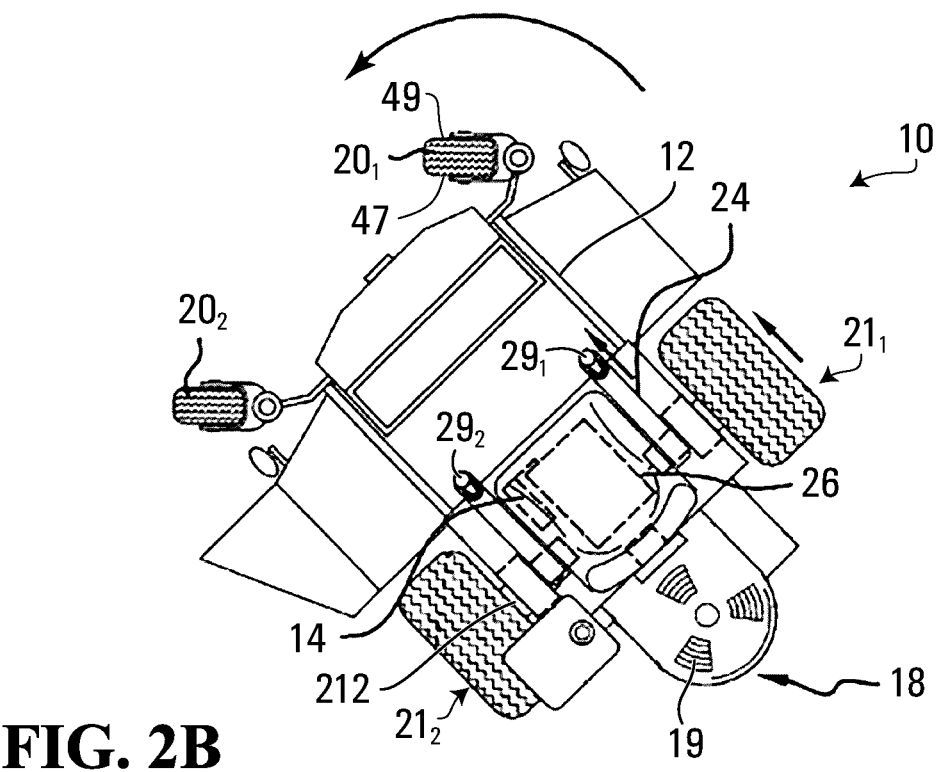
FIG. 2B shows a plan view of the vehicle of FIG. 1 with greater positive torque applied to a right rear wheel.
Figure 3:
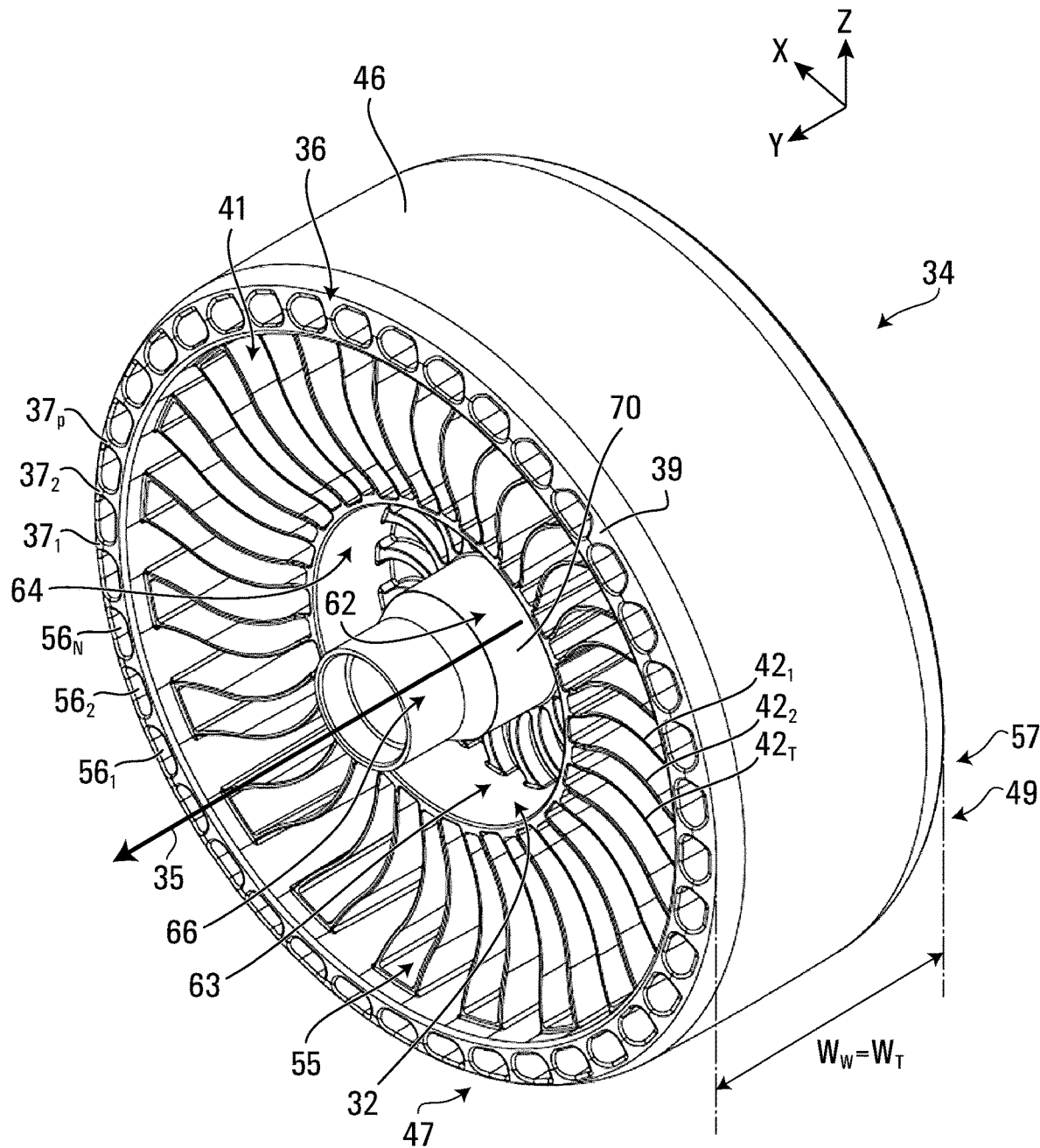
FIG. 3 shows an isometric view of a caster wheel comprising a non-pneumatic tire according to an embodiment.
Figure 4:
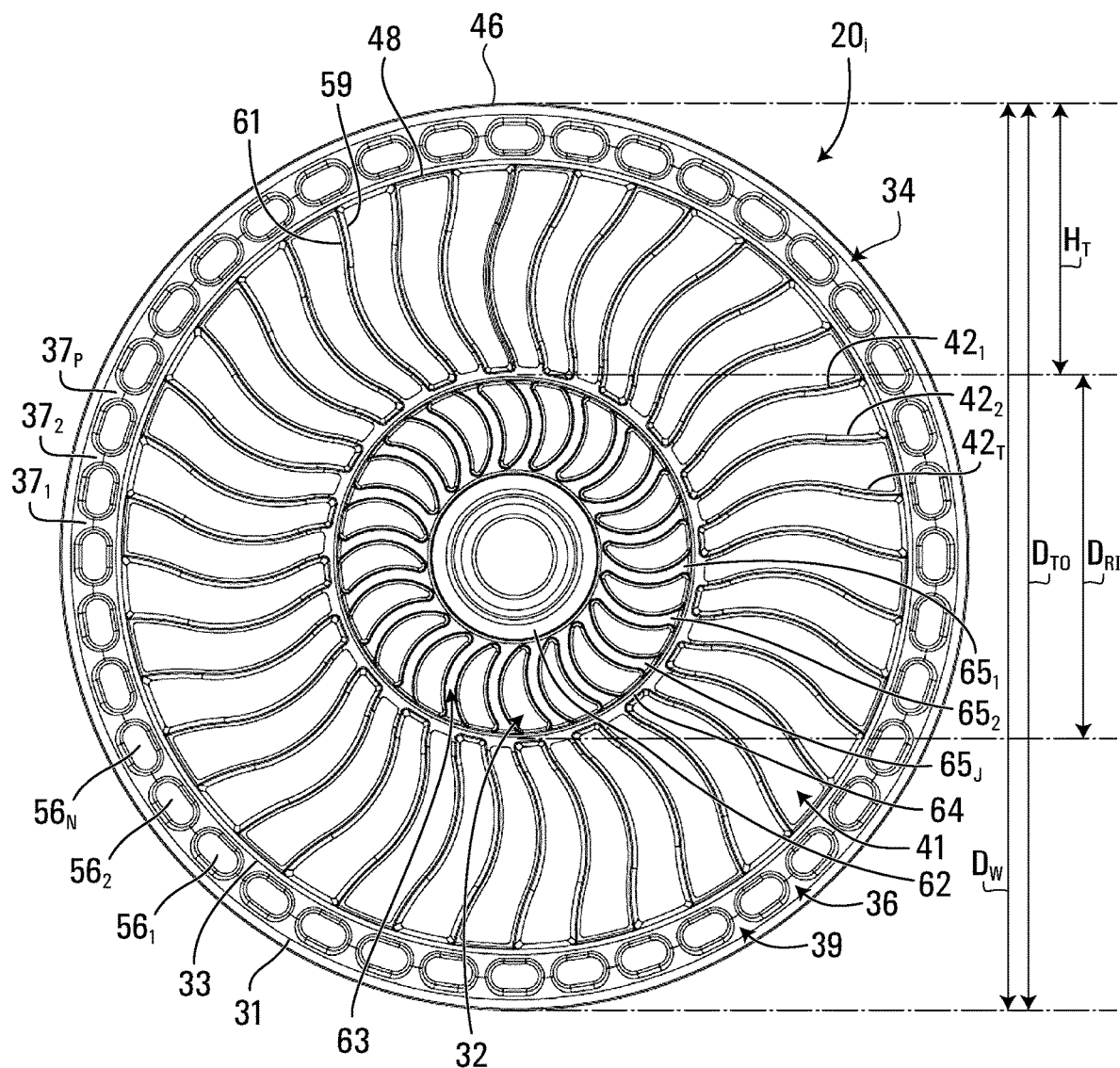
FIG. 4 shows a side-elevation view of the caster wheel of FIG. 3.

FIGS. 2A and 2B show plan views of the ZTR mower in zero turn operation. In FIG. 2A, the vehicle has a greater positive torque applied to the left rear wheel 16. This creates a yaw in the clockwise sense. In FIG. 2B, the vehicle has a greater positive torque applied to the right rear wheel. This creates a yaw in the counter clockwise sense. In FIG. 2A, the caster wheels $20_1$, $20_2$ can be rapidly forced in a clockwise arc trajectory; in FIG. 2B, the caster wheels $20_1$, $20_2$ can be rapidly forced in a counter-clockwise arc trajectory. In these types of maneuvers, the caster wheels $20_1$, $20_2$ can be subject to obstacle impacts such as curbs and stumps.

The user interface 24 allows the user to interact with the ZTR mower 10. More particularly, the user interface 24 comprises an accelerator, a brake control, and the steering device 28 that are operated by the user to control motion of the ZTR mower 10 on the ground. The user interface 24 may also comprise an instrument panel (e.g., a dashboard) which provides indicators (e.g., a speedometer indicator, a tachometer indicator, etc.) to convey information to the user.

The mowing implement 18 is configured to engage and mow the lawn. For example, the mowing implement 18 may comprise a blade 19 powered by power derived from the powertrain 14 to move and mow the lawn.

The drive wheels $21_1$, $21_2$ and the caster wheels $20_1$, $20_2$ engage the ground. More particularly, in this example, the drive wheels $21_1$, $21_2$ provide traction to the ZTR mower 10 and support a substantial part (e.g., a majority) of a weight of the ZTR mower 10, including a weight of the powertrain 14, and the user in use, while the caster wheels $20_1$, $20_2$ support a lesser part of the weight of the ZTR mower 10, such as part of the mowing implement 18, and provide pitch and roll stability. The drive wheels $21_1$, $21_2$ and the caster wheels $20_1$, $20_2$ provide shock absorption when the ZTR mower 10 travels on the ground. In this example, the drive wheels $21_1$, $21_2$ are larger in diameter than the caster wheels $20_1$, $20_2$.

In this embodiment, each one of the drive wheels $21_1$, $21_2$ comprises a tire 210 for contacting the ground and a hub 211 for connecting each one of the drive wheel $21_1$, $21_2$ to an axle 212 of the ZTR mower 10. More particularly, in this embodiment, the tire 210 is a pneumatic tire.

Each caster wheel $20_i$ comprises a non-pneumatic tire 34 for contacting the ground and a hub 32 for connecting the caster wheel $20_i$ to an axle 17 that is supported by the ZTR mower 10. The non-pneumatic tire 34 is a compliant wheel structure that is not supported by gas (e.g., air) pressure and that is resiliently deformable (i.e., changeable in configuration) as the caster wheel $20_i$ contacts the ground.

With additional reference to FIGS. 3 to 6B, the caster wheel $20_i$ has an axis of rotation 35, which defines an axial direction (also referred to as a "Y" direction) parallel to the axis of rotation 35 of the caster wheel $20_i$, a vertical direction (also referred to as a "Z" direction) that is normal to the axis of rotation 35 of the caster wheel $20_i$, and a horizontal direction (also referred to as a "X" direction) that is normal to the axis of rotation 35 of the caster wheel $20_i$ and the vertical direction and can be viewed as corresponding to a heading direction of the caster wheel $20_i$. The axial direction of the caster wheel $20_i$ can also be referred to as a lateral or widthwise direction of the caster wheel $20_i$, while each of the vertical direction and the horizontal direction of the caster wheel $20_i$ can also be referred to as radial direction of the caster wheel $20_i$. The caster wheel $20_i$ also has a circumferential direction (also referred to as a "C" direction). The caster wheel $20_i$ has an outer diameter $D_W$ and a width $W_W$. It comprises an inboard lateral side 47 for facing towards a center of the ZTR mower 10 in the widthwise direction of the ZTR mower 10 and an outboard lateral side 49 opposite its inboard lateral side 47.

Figure 5:
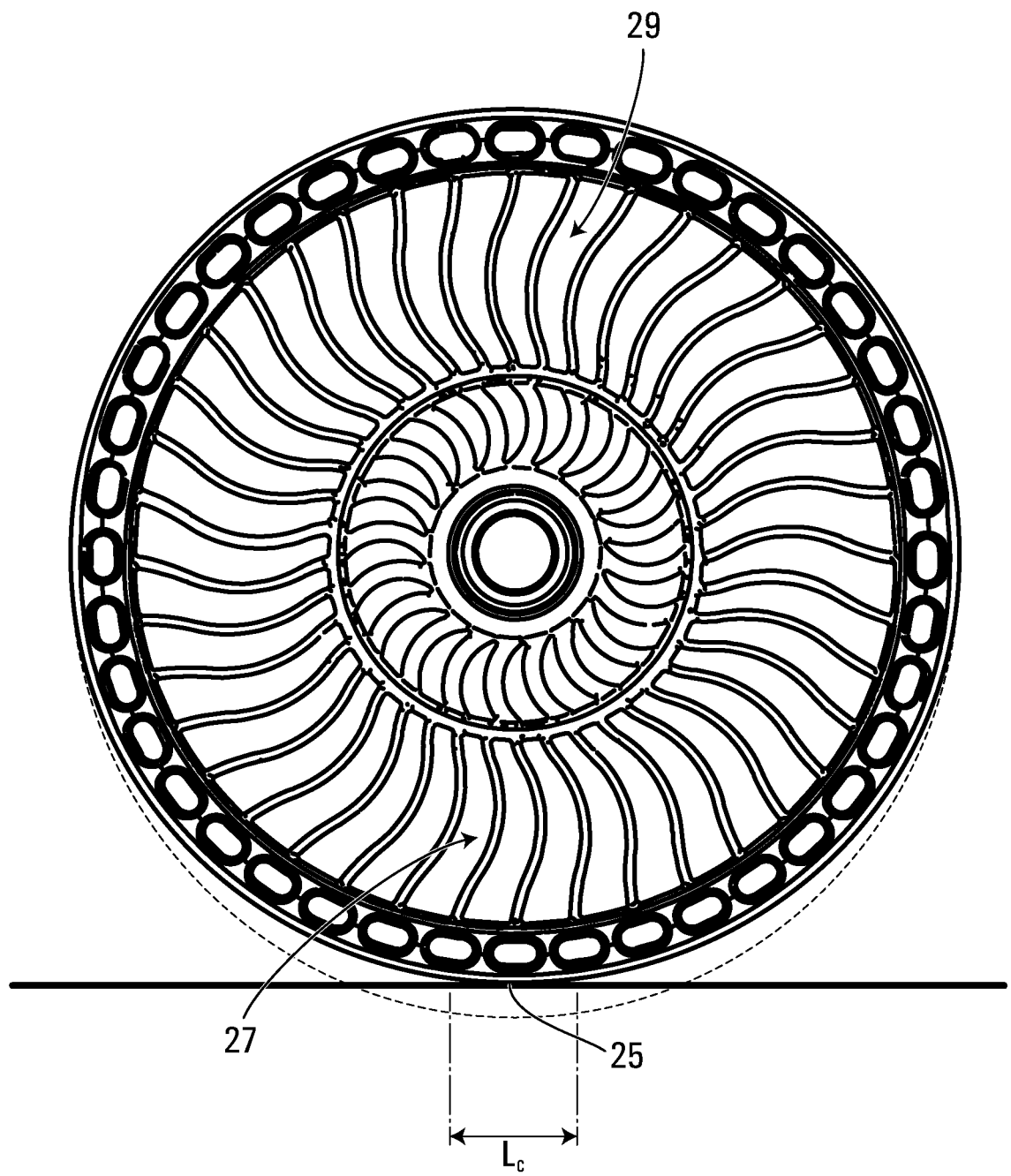
FIG. 5 shows a side-elevation view of the caster wheel of FIG. 3 as it engages the ground.

As shown in FIG. 5, when it is in contact with the ground, the caster wheel $20_i$ has an area of contact 25 with the ground, which may be referred to as a "contact patch" of the caster wheel $20_i$ with the ground. The contact patch 25 of the caster wheel $20_i$, which is a contact interface between the non-pneumatic tire 34 and the ground, has a dimension $L_C$ in the horizontal direction of the caster wheel $20_i$ and a dimension $W_C$ in the lateral direction of the caster wheel $20_i$.

The non-pneumatic tire 34 comprises an annular beam 36 and an annular support 41 that is disposed between the annular beam 36 and the hub 32 of the caster wheel $20_i$ and configured to support loading on the caster wheel wheel $20_i$ as the caster wheel wheel $20_i$ engages the ground. In this embodiment, the non-pneumatic tire 34 is tension-based such that the annular support 41 is configured to support the loading on the caster wheel $20_i$ by tension. That is, under the loading on the caster wheel $20_i$, the annular support 41 is resiliently deformable such that a lower portion 27 of the annular support 41 between the axis of rotation 35 of the caster wheel $20_i$ and the contact patch 25 of the caster wheel $20_i$ is compressed and an upper portion 29 of the annular support 41 above the axis of rotation 35 of the caster wheel $20_i$ is in tension to support the loading.

The annular beam 36 of the tire 34 is configured to deflect under the loading on the caster wheel $20_i$ at the contact patch 25 of the caster wheel $20_i$ with the ground. In this embodiment, the annular beam 36 is configured to deflect such that it applies a homogeneous contact pressure along the dimension $L_C$ of the contact patch 25 of the caster wheel $20_i$ with the ground.

More particularly, in this embodiment, the annular beam 36 comprises a shear band 39 configured to deflect predominantly by shearing at the contact patch 25 under the loading on the caster wheel $20_i$. That is, under the loading on the caster wheel $20_i$, the shear band 39 deflects significantly more by shearing than by bending at the contact patch 25. The shear band 39 is thus configured such that, at a center of the contact patch 25 of the caster wheel $20_i$ in the vertical direction of the caster wheel $20_i$, a shear deflection of the shear band 39 is significantly greater than a bending deflection of the shear band 39. For example, in some embodiments, at the center of the contact patch 25 of the caster wheel $20_i$ in the vertical direction of the caster wheel $20_i$, a ratio of the shear deflection of the shear band 39 over the bending deflection of the shear band 39 may be at least 1.2, in some cases at least 1.5, in some cases at least 2, in some cases at least 3, and in some cases even more (e.g., 4 or more). For instance, in some embodiments, the annular beam 36 may be designed based on principles discussed in U.S. Pat. No. 9,751,270, which is hereby incorporated by reference herein, in order to achieve the homogeneous contact pressure along the length $L_C$ of the contact patch 25 of the caster wheel $20_i$ with the ground.

In this example of implementation, the shear band 39 comprises an outer rim 31, an inner rim 33, and a plurality of openings $56_1$-$56_N$ between the outer rim 31 and the inner rim 33. The shear band 39 comprises a plurality of interconnecting members $37_1$-$37_P$ that extend between the outer rim 31 and the inner rim 33 and are disposed between respective ones of the openings $56_1$-$56_N$. The interconnecting members $37_1$-$37_P$ may be referred to as "webs" such that the shear band 39 may be viewed as being "web-like" or "webbing". The shear band 39, including the openings $56_1$-$56_N$ and the interconnecting members $37_1$-$37_P$, may be arranged in any other suitable way in other embodiments.

The openings $56_1$-$56_N$ of the shear band 39 help the shear band 39 to deflect predominantly by shearing at the contact patch 25 under the loading on the caster wheel $20_i$. In this embodiment, the openings $56_1$-$56_N$ extend from the inboard lateral side 47 to the outboard lateral side 49 of the tire 34. That is, the openings $56_1$-$56_N$ extend laterally though the shear band 39 in the lateral direction of the caster wheel $20_i$. The openings $56_1$-$56_N$ may extend laterally without reaching the inboard lateral side 47 and/or the outboard lateral side 49 of the tire 34 in other embodiments. The openings $56_1$-$56_N$ may have any suitable shape. In this example, a cross-section of each of the openings $56_1$-$56_N$ is circular. The cross-section of each of the openings $56_1$-$56_N$ may be shaped differently in other examples (e.g., polygonal, partly curved and partly straight, etc.). In some cases, different ones of the openings $56_1$-$56_N$ may have different shapes. In some cases, the cross-section of each of the openings $56_1$-$56_N$ may vary in the lateral direction of the caster wheel $20_i$. For instance, in some embodiments, the openings $56_1$-$56_N$ may be tapered in the lateral direction of the caster wheel $20_i$ such that their cross-section decreases inwardly axially (e.g., to help minimize debris accumulation within the openings $56_1$-$56_N$).

In this embodiment, the tire 34 comprises a tread 50 for enhancing traction between the tire 34 and the ground. The tread 50 is disposed about an outer peripheral extent 46 of the annular beam 36, in this case about the outer rim 31 of the shear band 39. More particularly, the tread 50 may comprise a plurality of tread projections that project from a base of the tread 50. The tread 50 may be implemented in any other suitable way in other embodiments (e.g., may comprise a plurality of tread recesses, etc.).

The annular support 41 is configured to support the loading on the caster wheel $20_i$ as the caster wheel $20_i$ engages the ground. As mentioned above, in this embodiment, the annular support 41 is configured to support the loading on the caster wheel $20_i$ by tension. More particularly, in this embodiment, the annular support 41 comprises a plurality of support members $42_1$-$42_T$ that are distributed around the tire 34 and resiliently deformable such that, under the loading on the wheel $20_i$, lower ones of the support members $42_1$-$42_T$ in the lower portion 27 of the annular support 41 (between the axis of rotation 35 of the caster wheel $20_i$ and the contact patch 25 of the caster wheel $20_i$) are compressed and bend while upper ones of the support members $42_1$-$42_T$ in the upper portion 29 of the annular support 41 (above the axis of rotation 35 of the caster wheel $20_i$) are tensioned to support the loading. As they support load by tension when in the upper portion 29 of the annular support 41, the support members $42_1$-$42_T$ may be referred to as "tensile" members.

In this embodiment, the support members $42_1$-$42_T$ are elongated and extend from the annular beam 36 towards the hub 32 generally in the radial direction of the caster wheel $20_i$. In that sense, the support members $42_1$-$42_T$ may be referred to as "spokes" and the annular support 41 may be referred to as a "spoked" support.

More particularly, in this embodiment, each spoke $42_T$ extends from an inner peripheral surface 48 of the annular beam 36 towards the hub 32 generally in the radial direction of the caster wheel $20_i$ and from a first lateral end 55 to a second lateral end 57 in the lateral direction of the caster wheel $20_i$. In this case, the spoke $42_T$ extends in the lateral direction of the caster wheel $20_i$ for at least a majority of a width $W_T$ of the tire 34, which in this case corresponds to the width $W_W$ of the caster wheel $20_i$. For instance, in some embodiments, the spoke $42_T$ may extend in the lateral direction of the caster wheel $20_i$ for more than half, in some cases at least 60%, in some cases at least 80%, and in some cases an entirety of the width $W_T$ of the tire 34. In other embodiments, the spokes $42_T$ may be tapered in the radial direction of the caster wheel $20_i$ such that a width of the spokes $42_T$ decreases towards the axis of rotation 35 of the caster wheel $20_i$. Moreover, the spoke $42_T$ has a thickness $T_S$ measured between a first surface face 59 and a second surface face 61 of the spoke $42_T$ that is significantly less than a length and width of the spoke $42_T$.

When the caster wheel $20_i$ is in contact with the ground and bears a load (e.g., part of the weight of the ZTR mower 10), respective ones of the spokes $42_1$-$42_T$ that are disposed in the upper portion 29 of the spoked support 41 (i.e., above the axis of rotation 35 of the caster wheel $20_i$) are placed in tension while respective ones of the spokes $42_1$-$42_T$ that are disposed in the lower portion 27 of the spoked support 41 (i.e., adjacent the contact patch 25) are placed in compression. The spokes $42_1$-$42_T$ in the lower portion 27 of the spoked support 41 which are in compression bend in response to the load. Conversely, the spokes $42_1$-$42_T$ in the upper portion 29 of the spoked support 41 which are placed in tension support the load by tension.

The tire 34 has an inner diameter $D_{TI}$ and an outer diameter $D_{TO}$, which in this case corresponds to the outer diameter $D_W$ of the caster wheel $20_i$. A sectional height $H_T$ of the tire 34 is half of a difference between the outer diameter $D_{TO}$ and the inner diameter $D_{TI}$ of the tire 34. The sectional height $H_T$ of the tire may be significant in relation to the width $W_T$ of the tire 34. In other words, an aspect ratio AR of the tire 34 corresponding to the sectional height $H_T$ over the width $W_T$ of the tire 34 may be relatively high. For instance, in some embodiments, the aspect ratio AR of the tire 34 may be at least 70%, in some cases at least 90%, in some cases at least 110%, and in some cases even more. Also, the inner diameter $D_{TI}$ of the tire 34 may be significantly less than the outer diameter $D_{TO}$ of the tire 34 as this may help for compliance of the caster wheel $20_i$. For example, in some embodiments, the inner diameter $D_{TI}$ of the tire 34 may be no more than half of the outer diameter $D_{TO}$ of the tire 34, in some cases less than half of the outer diameter $D_{TO}$ of the tire 34, in some cases no more than 40% of the outer diameter $D_{TO}$ of the tire 34, and in some cases even a smaller fraction of the outer diameter $D_{TO}$ of the tire 34. In one non-limiting embodiment, the tire 34 may have $D_{TO}$=13" and $W_T$=6.5". In this particular configuration, the tire 34 may be a front tire of a ZTR, often referred to as a "caster" tire.

The hub 32 is disposed centrally of the tire 34 and connects the caster wheel $20_i$ to the axle 17 that is supported by the ZTR mower 10. The hub 32 comprises an inner annular member 62, an outer annular member 64 radially outward of the inner annular member 62, an intermediate member 63 interconnecting the inner annular member 62 and the outer annular member 64 and a mount 66 for mounting the caster wheel $20_i$ to the axle 17 supported by the ZTR mower 10.

Figure 6A:
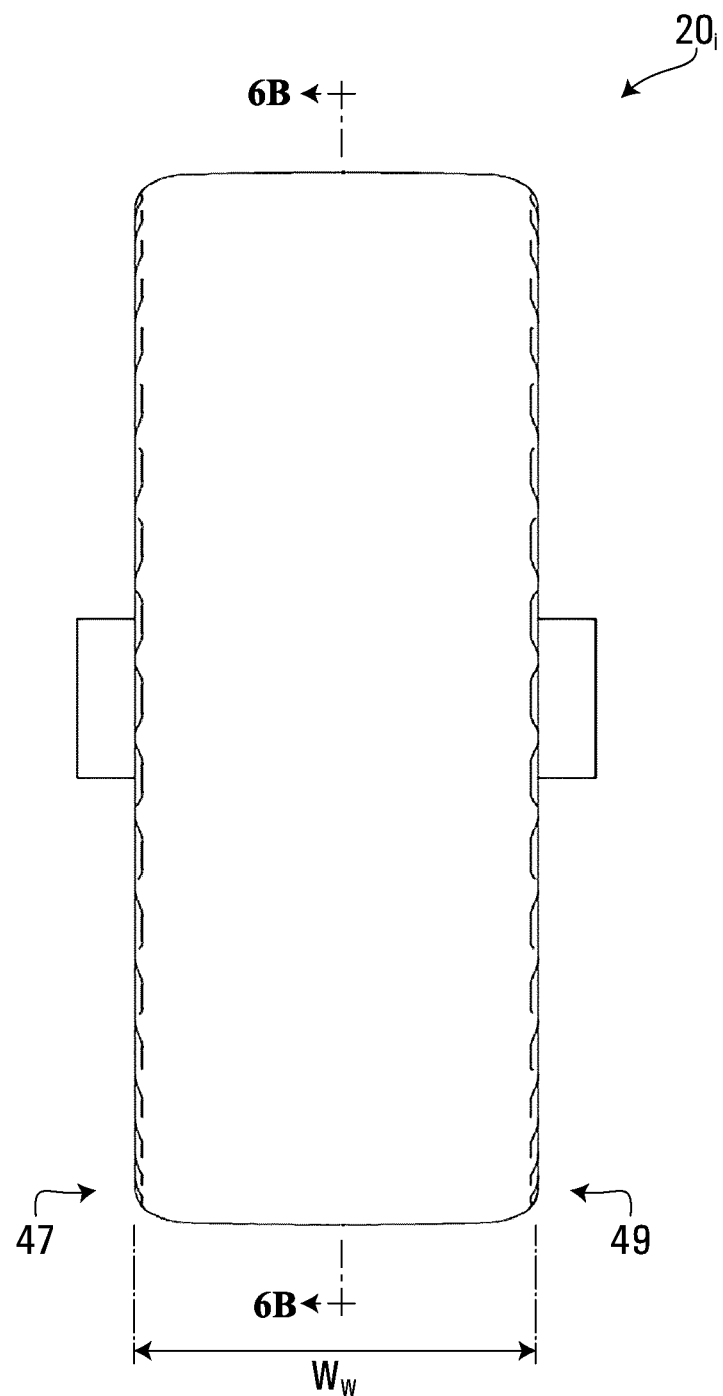
FIG. 6A shows a side-elevation view in the YZ plane of the caster wheel of FIG. 3.
Figure 6B:
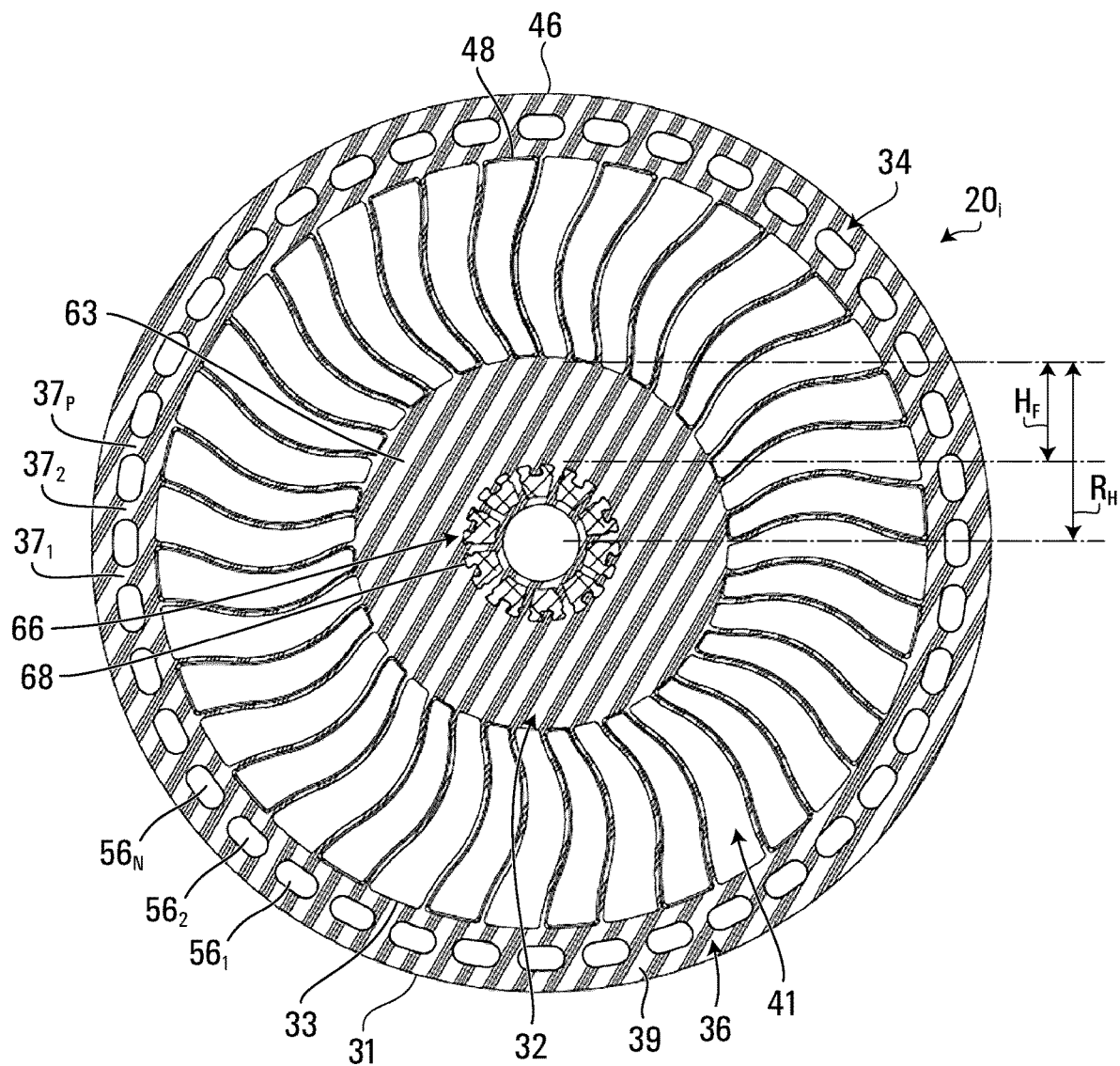
FIG. 6B shows a side-elevation cutaway view in the XZ plane taken along line 6B-6B of FIG. 6A.
Figure 7:
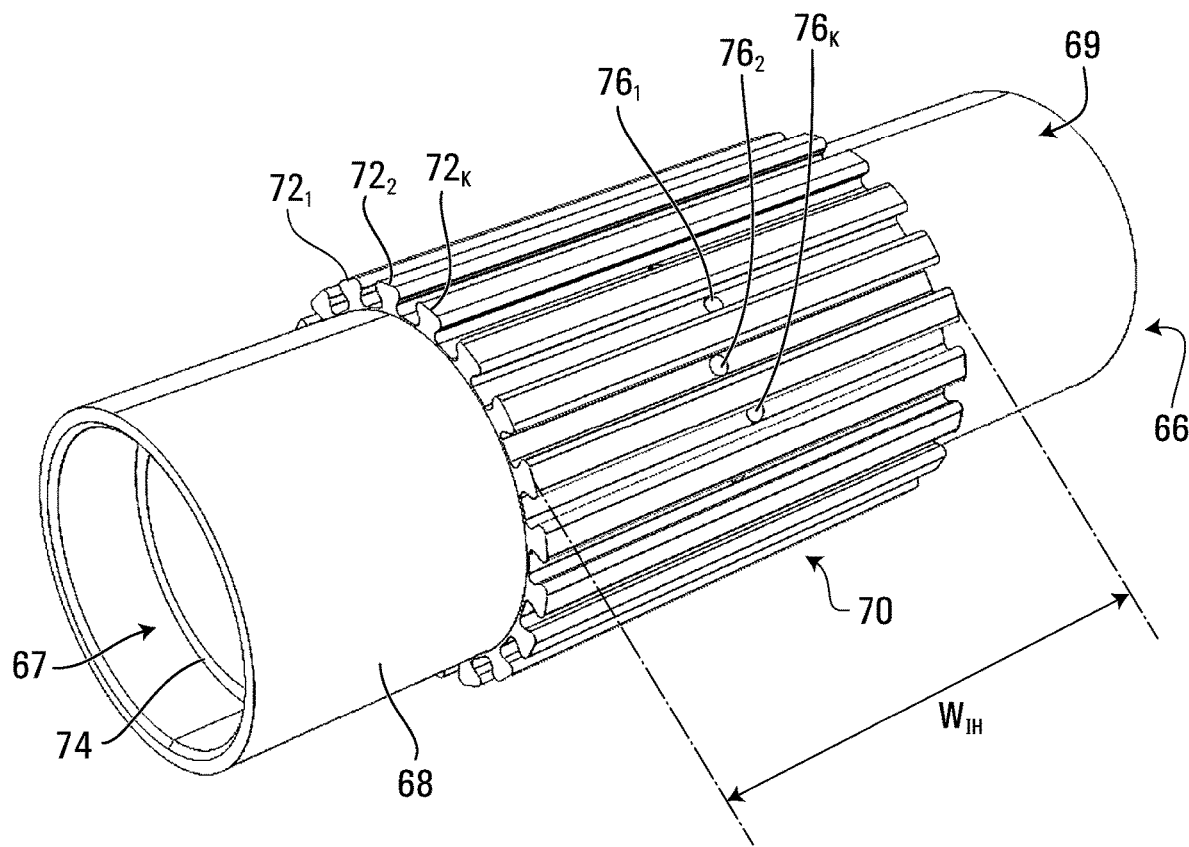
FIG. 7 shows an isometric view of a mount for mounting the caster wheel of FIG. 3 according to an embodiment.

With further reference to FIG. 7, in this embodiment, the mount 66 comprises a housing 68 to house one or more bearings (not shown) which engage the axle 17 and allow the caster wheel $20_i$ to rotate about it. The housing 68 is generally cylindrical and comprises an inner surface 67 and an outer surface 69. The mount 66 further comprises an interlocking mean 70 which generally extends around a circumference of the outer surface 69 of the housing 68. The interlocking mean 70 has a length substantially equal to a dimension $W_{IH}$ of the inner annular member 62 of the hub 32 in the lateral direction of the caster wheel $20_i$. In this non-limiting embodiment, the interlocking mean 80 comprises a plurality of tapered projections $72_1$-$72_K$ which generally protrude away from the outer surface 69 of the housing 68. As shown in FIG. 6B, the plurality of tapered projections $72_1$-$72_K$ of the mount 66 may be configured to interlock with a plurality of corresponding recesses of the inner annular member 62 of the hub 32 such that a rotation of the mount 66, and therefore of the interlocking mean 70, will impart a rotational movement to the caster wheel $20_i$ about the axle 17 via the hub 32. The plurality of tapered projections $72_1$-$72_K$ and the plurality of corresponding recesses may have any shape and/or any dimension in other embodiments. In yet further embodiments, the housing 68 may be chemically adhered to the inner annular member 62 of the hub 32 directly via the outer surface 69 of the housing 68. Flanges 74 may be defined circumferentially at each axial extremity of the inner surface 67 of the housing 68. The flanges 74 may be configured to receive and secure one or more bearings (not shown) which engage the axle 17 and allow the caster wheel $20_i$ to rotate about it. The outer annular member 64 of the hub 32 interconnects the hub 32 and the spoked support 41, namely the spokes $42_1$-$42_T$.

The caster wheel $20_i$ may be made up of one or more materials. In this embodiment, the non-pneumatic tire 34 comprises a tire material 45 that makes up at least a substantial part (i.e., a substantial part or an entirety) of the tire 34. The hub 32 comprises a hub material 72 that makes up at least a substantial part of the hub 32. In some embodiments, the tire material 45 and the hub material 72 may be different materials. In other embodiments, the tire material 45 and the hub material 72 may be a common material (i.e., the same material). Assuming the tire material 45 and the hub material 72 are the same material a tire such as the tire 34 having $D_{TO}$=13" and $W_T$=6.5" generally comprises about 3.2 kg of tire material 45. Tires comprising up to 16 kg of tire material 45 may be routinely manufactured. It is appreciated that the tire 34 may have any other suitable dimension in other embodiments.

In this embodiment, the tire material 45 constitutes at least part of the annular beam 36 and at least part of the spokes $42_1$-$42_T$. Also, in this embodiment, the tire material 45 constitutes at least part of the tread 50. More particularly, in this embodiment, the tire material 45 constitutes at least a majority (e.g., a majority or an entirety) of the annular beam 36, the tread 50, and the spokes $42_1$-$42_T$. In this example of implementation, the tire material 45 makes up an entirety of the tire 34, including the annular beam 36, the spokes $42_1$-$42_T$, and the tread 50. The tire 34 is thus monolithically made of the tire material 45. In this example, therefore, the annular beam 36 is free of (i.e., without) a substantially inextensible reinforcing layer running in the circumferential direction of the wheel $20_i$ (e.g., a layer of metal, composite (e.g., carbon fibers, other fibers), and/or another material that is substantially inextensible running in the circumferential direction of the wheel $20_i$). In that sense, the annular beam 36 may be said to be "unreinforced".

The tire material 45 is elastomeric. For example, in this embodiment, the tire material 45 is a thermoplastic elastomer (i.e., not a cross-linked elastomer). The hub material 70 may be elastomeric, metallic or may be any other suitable material in other embodiments.

Figure 8:
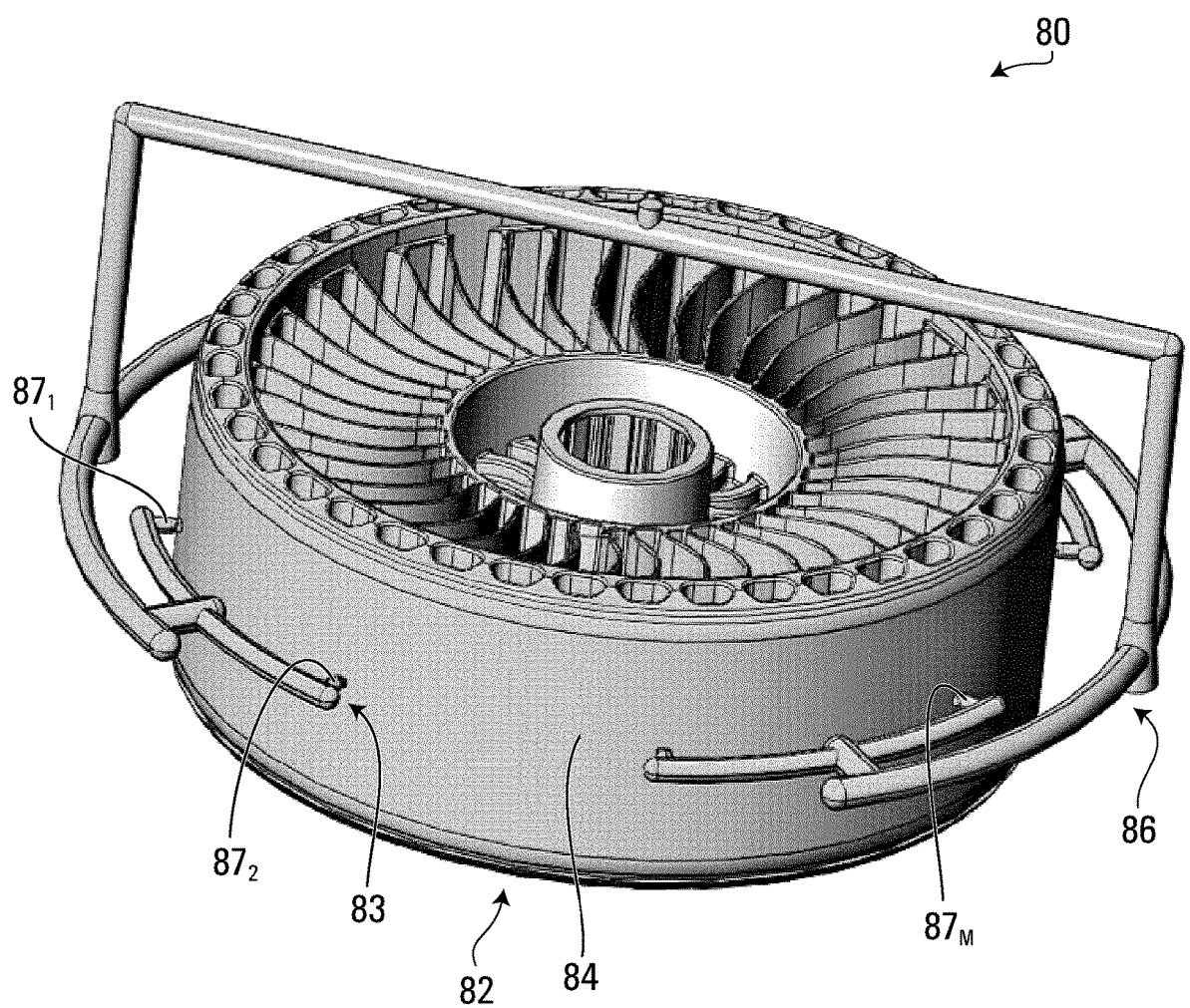
FIG. 8 shows an isometric view of a molding apparatus for an outer gating thermoplastic injection process of the non-pneumatic tire of FIG. 3.

In this non-limiting embodiment, with further reference to FIG. 8, the non-pneumatic tire 34, including the annular beam 36 and the annular support 41 of the wheel $20_i$ may be injection molded using a thermoplastic injection process that is enhanced, including by using a molding apparatus 80 that comprises a mold 82 including a mold cavity 84 and an outer gating 86 to inject the thermoplastic material 45 at an outer part 83 of the mold 82 into the mold cavity 84 adjacent to where the annular beam 36 is to be formed such that the thermoplastic material 45 flows first where at least part of the annular beam 36 is before flowing where at least part of the annular support 41 is, i.e., before flowing where at least part of the spokes $42_1$-$42_T$ are in this case. The outer gating 86 of the mold 82 comprises a plurality of gates $87_1$-$87_m$ located at the outer part 83 of the mold 82 adjacent to where the annular beam 36 is to be formed.

In this embodiment, the gates $87_1$-$87_m$ are substantially evenly spaced around a circumference of the mold 82. In some embodiments, the outer gating 86 of the mold 82 may be configured such that m=8. The outer gating 86 of the mold 82 may be configured such that m has any other suitable value in other embodiments. It is appreciated that, in this embodiment, an outer peripheral extent of the annular beam 36 comprises a plurality of injection-molding gate marks corresponding to the gates $87_1$-$87_m$.

In this embodiment, the thermoplastic tire material 45 is first heated to a temperature between 200° C. and 280° C. and then injected inside the mold cavity 84 of the mold 82 via the gates $87_1$-$87_m$, the mold 82 being at a temperature of between 40° C. and 70° C. During injection of the tire material 45, the pressure inside each one of the plurality of gates $87_1$-$87_m$ may be between 50 MPa and 130 MPa. At these pressures, the mold 82 may be filled in less than 20 seconds, in some cases in less than 15 seconds, in some cases in less than 10 seconds, in some cases in less than 7 seconds and in some cases even less. The thermoplastic injection processes described above may be used for the manufacture of parts having a volume of no more than 40,000 cc, in some cases no more than 20,000 cc, in some cases no more than 10,000 cc, in some cases no more than 5,000 cc, in some cases no more than 1,000 cc and in some cases even less.

Because this injection process uses the gates $87_1$-$87_m$ spaced around the outer part 83 of the mold 82 adjacent to where the annular beam 36 is to be formed, it is referred to as "outer gating". After the annular beam 36 and the annular support 41, i.e. the spokes $42_1$-$42_T$, have been formed, the tire 34 is demolded when the temperature of the tire material 45 is low enough to allow the tire material 45 to solidify. In some non-limiting examples, the tire material 45 solidifies at a temperature between 130° C. and 230° C.

Figure 9:
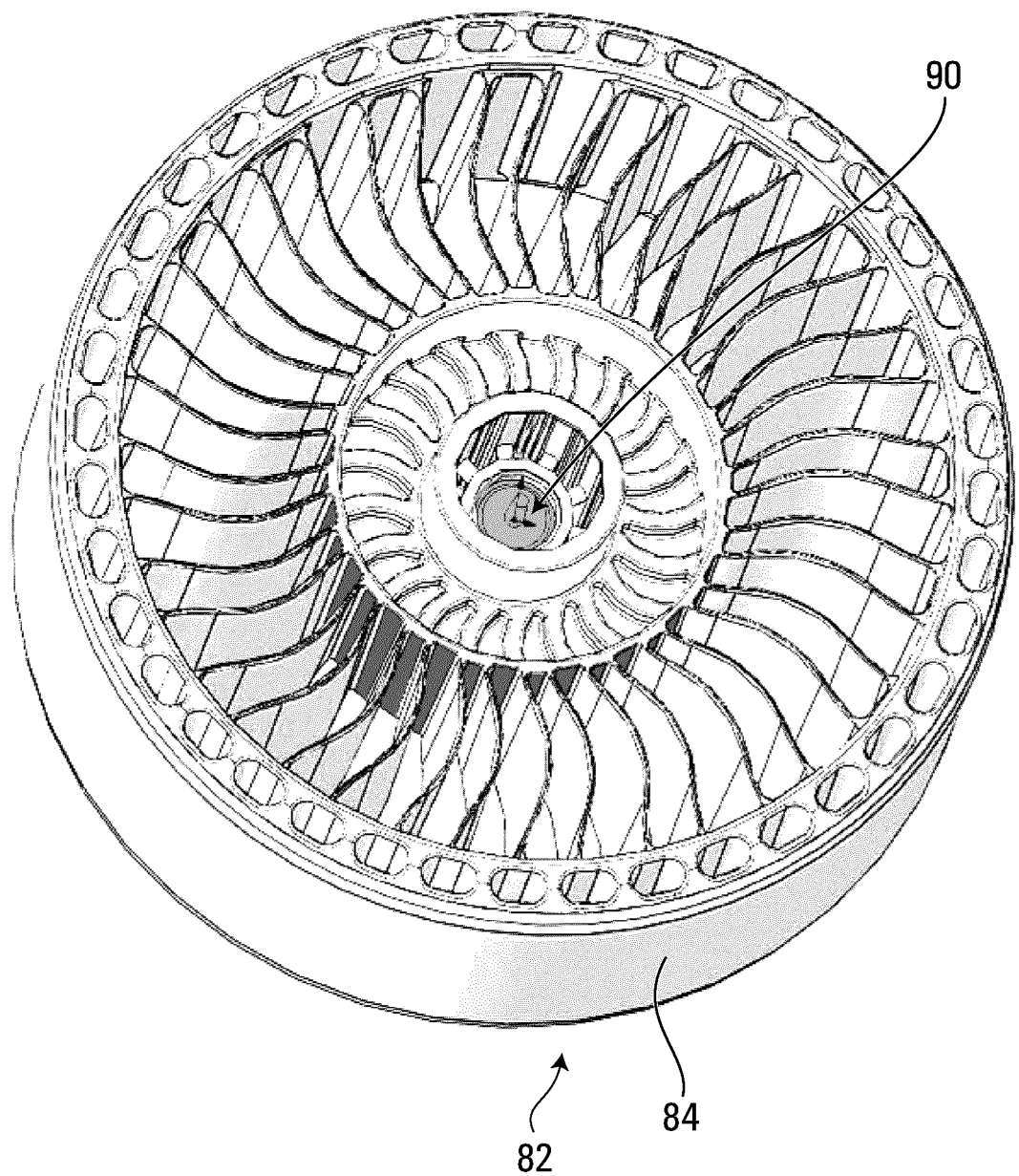
FIG. 9 shows an isometric view of a molding apparatus for a center gating thermoplastic injection process of the non-pneumatic tire of FIG. 3.

"Center gating", a thermoplastic injection process in which the tire material 45 is injected in a center of the wheel $20_i$ via a single central gate, is generally used for circular objects such as wheels, fans, turbine blades, cups and the likes. This is notably so because the use of a single gate minimizes waste and general production costs. Also, the use of a central gate should ensure uniform filling of the mold before the temperature of the tire material 45 is low enough to allow the tire material 45 to solidify. Shrinkage after injection and cooling of the tire material 45 is therefore uniform. In this configuration, with further reference to FIG. 9, the non-pneumatic tire 34, including the annular beam 36 and the annular support 41 of the wheel $20_i$ may be injection molded only using the mold 82 including the mold cavity 84. In this configuration, the mount 66 further comprises a plurality of openings $76_1$-$76_I$ generally positioned along a circumferential direction of the interlocking mean 70 that traverse the mount 66 in the radial direction of the mount 66. The plurality of openings $76_1$-$76_I$ allow the thermoplastic tire material 45 to be injected centrally via a single central gate 90 in the mold cavity 82 around the plurality of tapered projections $72_1$-$72_K$ such that the thermoplastic material 45 flows where at least part of the hub 32 is before flowing where at least part of the annular support 41I s, i.e., before flowing where at least part of the spokes $42_1$-$42_T$ are in this case, and then before flowing where at least part of the annular beam 36 is. In this configuration, the mount 66 is therefore positioned inside the mold 82 before the mold 82 is closed and the center gating process is initiated to ensure that the mount 66 is adequately affixed to the tire 34.

However, performance issues were encountered with tires manufactured using the center gating process described above, as further described below.

Figure 10A:
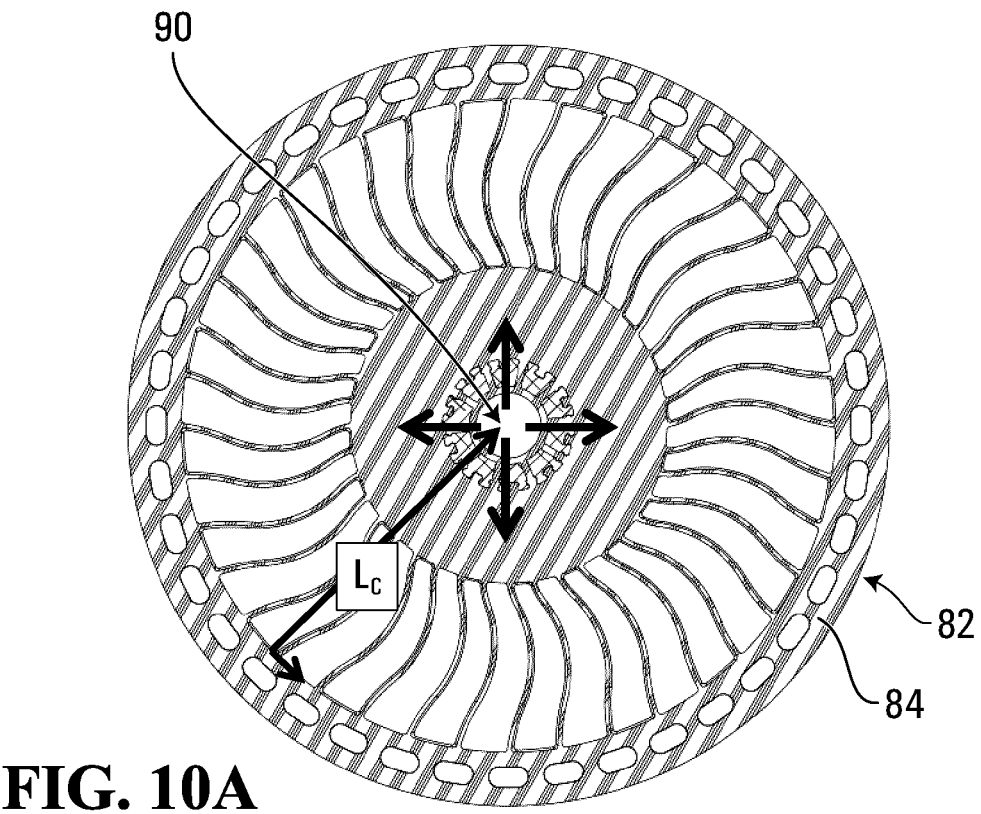
FIGS. 10A and 10B show a flow path in the center gating thermoplastic injection process of FIG. 8.
Figure 10B:
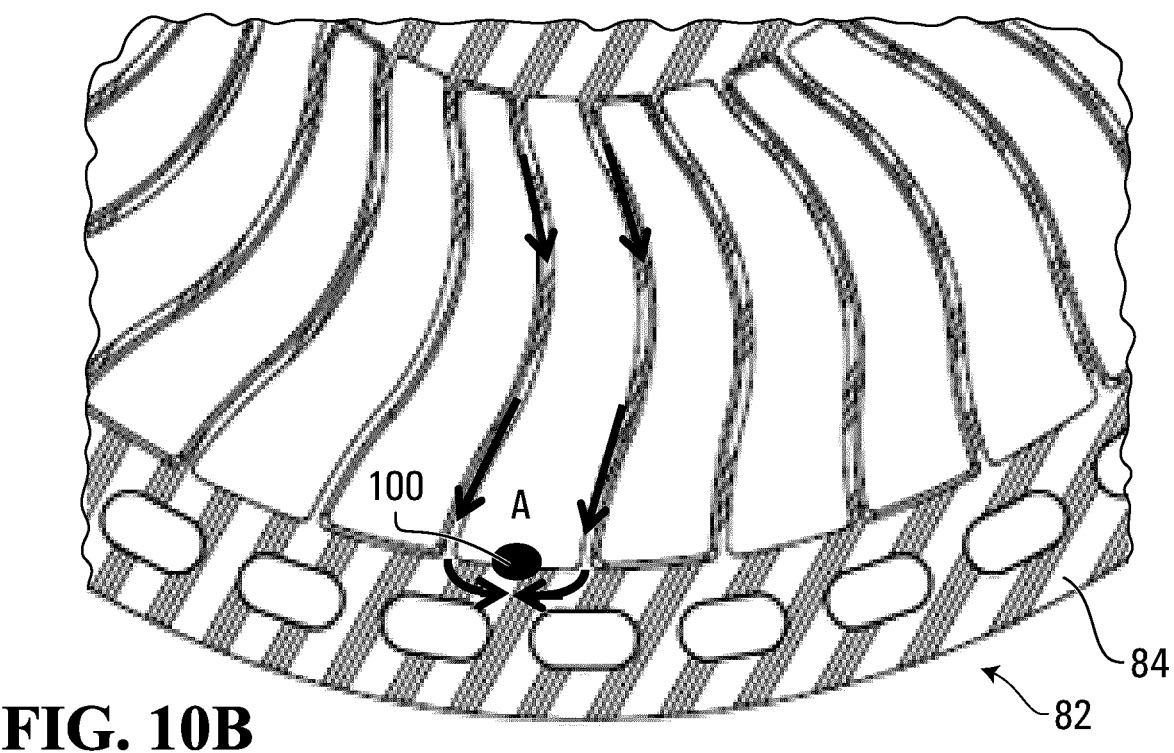

The material flow path of the tire material 45 in a center gating process is shown in FIGS. 10A and 10B. The tire material 45 passes through the mount 66 and radiates radially outward, filling the mold 82. In this configuration, the last region of the mold 82 to fill is the one corresponding to the annular beam 36 since it is the furthest away from the single central injection gate 90. The flow length $L_c$ shown corresponds to a distance from the single central injection gate 90 and point A on FIG. 10B, i.e. a point on the inner circumferential extent of the annular beam 36 equidistant from two successive ones of the spokes $42_1$-$42_T$. In this configuration, i.e. with a tire 34 having $D_{TO}$=13" and $W_T$=6.0", $L_c$=165 mm. Using the center gating process, the tire material 45 passes in the region of the mold 82 corresponding to the spokes $42_1$-$42_T$ before reaching the region of the mold 82 corresponding to the annular beam 36. Given the geometry of the spokes $42_1$-$42_T$, which in the configuration of FIGS. 10A and 10B are about 1.7 mm thick and 70 mm long, and a mold temperature of around 50° C., the temperature of the tire material 45 drops to a temperature between 150° C. to 190° C. before reaching the region of the mold 82 corresponding to the annular beam 36. Two mold flow fronts corresponding to two successive ones of the spokes $42_1$-$42_T$ connect at a radially inner surface of the annular beam 36 which may result in a weld line 100 at a surface of contact of the two mold flow fronts. Specifically, the weld line 100 is at least partially a result of the drop in temperature of the two mold flow fronts corresponding to two successive ones of the spokes $42_1$-$42_T$ which starts to solidify the tire material 45. At a temperature of less than 190° C., the temperature of the tire material 45 is low enough to decrease the strength of the tire material 45 at the location of the weld line 100.

Tires with $D_{TO}$=13" and $W_T$=6.0" were manufactured using the center gating process shown in FIG. 10A and 10B and subjected to endurance tests consisting of loading the tire on a 1.7 m diameter drum to a design load of 120 kg and rotating the drum to obtain a tire speed of 20 km/h. The endurance test results were not satisfactory. At the design load of 120 kg, the tires failed at less than 4,000 km, whereas tires commercially-available did not exhibit failure at least before 20,000 km. Failure occurred due to cracks at the radially inward surface of the annular beam 36 and evidence of weld lines 100 was found at the inner circumferential extent of the annular beam 36.

Finite-Element Method (FEM) mold flow analysis for the center gating process was performed using the following conditions:

Material: DuPont Hytrel 5526;
Melt temperature: 218° C.;
Injection fill time: 6.7 seconds;
Injection pressure: 72 MPa; and
Mold temperature: 45° C.

Figure 11:
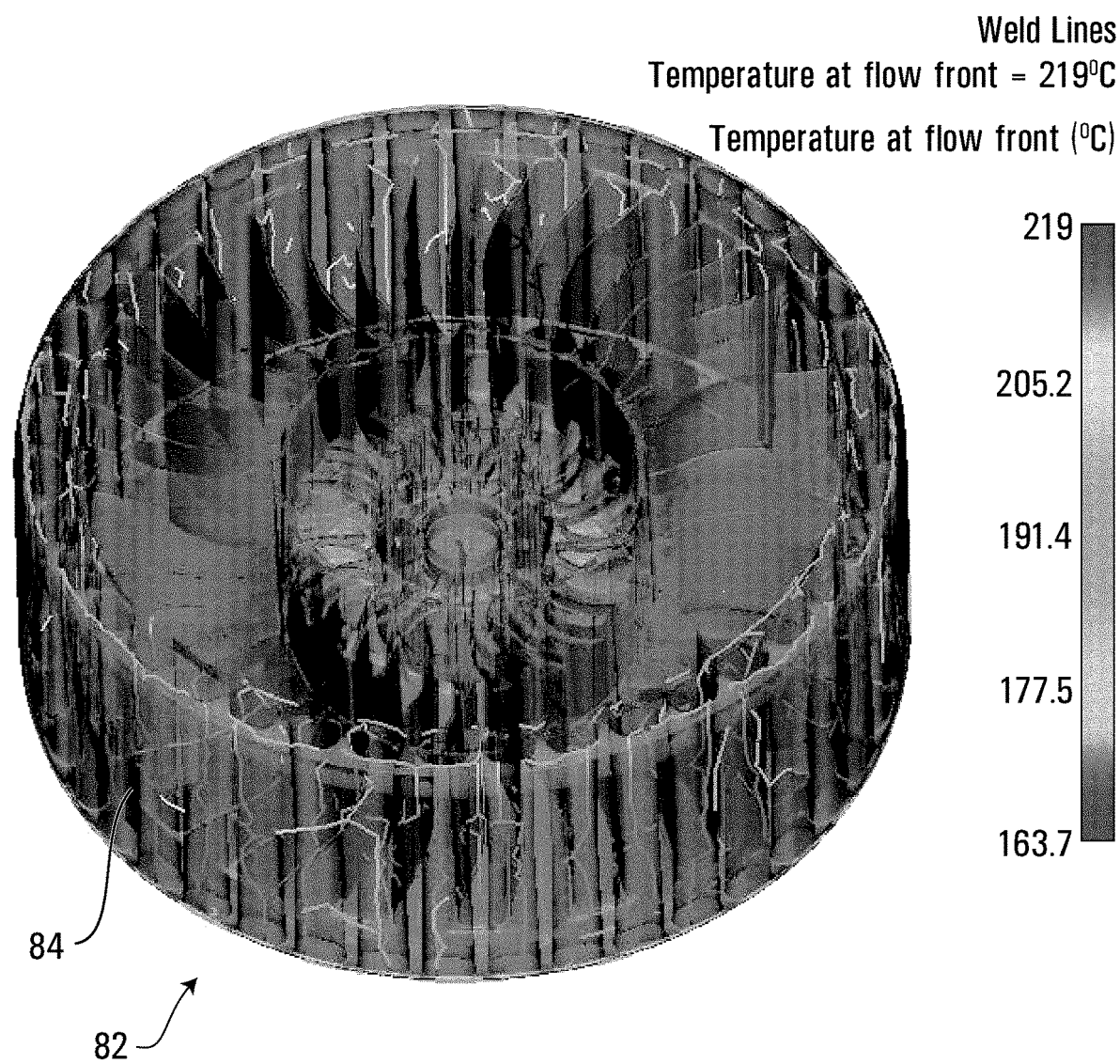
FIG. 11 shows finite-element modeling (FEM) mold flow analysis results for a temperature of a material of the tire in the center gating thermoplastic injection process of FIGS. 10A and 10B.
Figure 12:
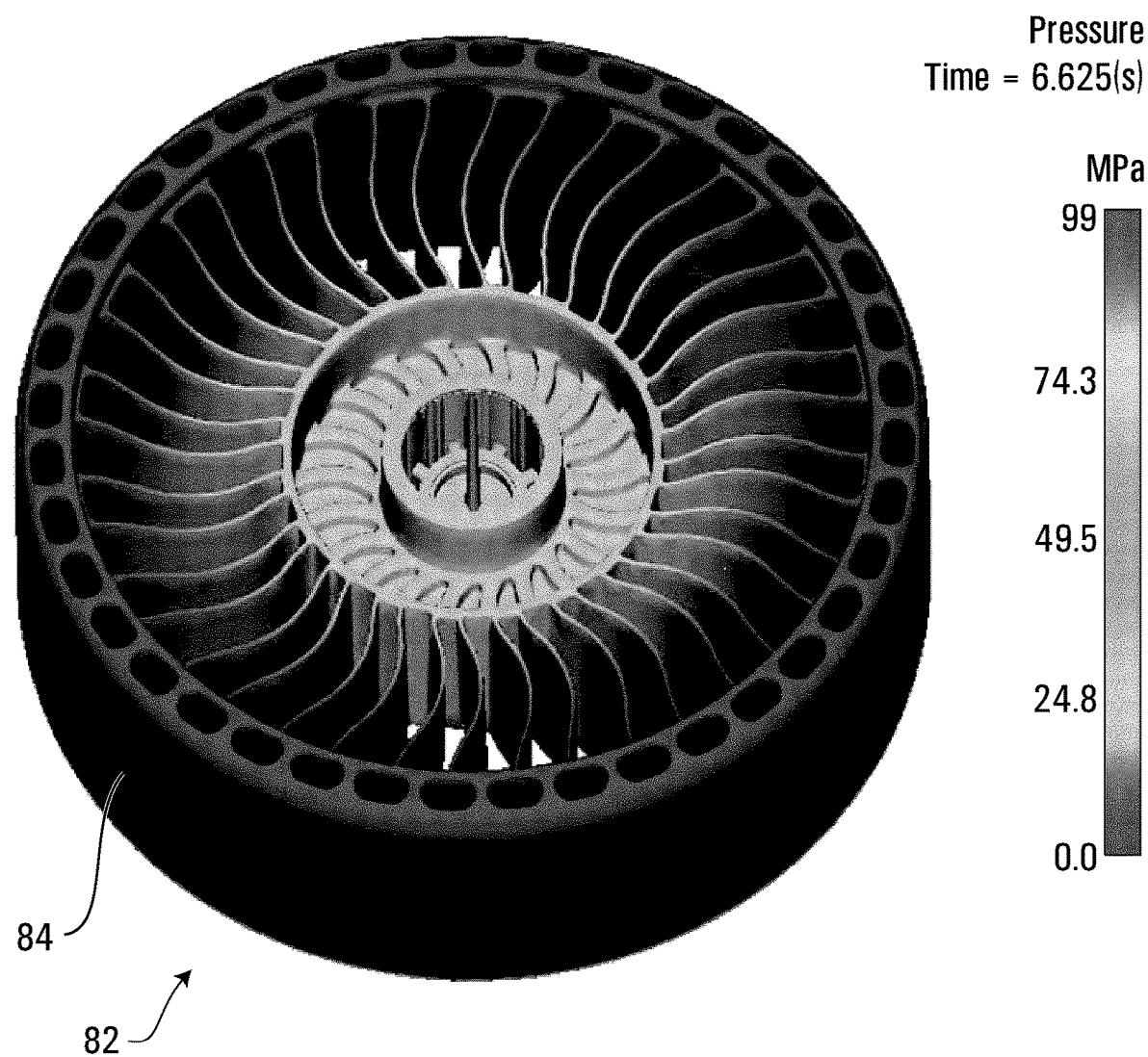
FIG. 12 shows FEM mold flow analysis results for pressure at end of injection in the center gating thermoplastic injection process of FIGS. 10A and 10B.

FEM results for flow front temperature of the tire material 45 in the center gating process are shown in FIG. 11. Weld lines are shown to form at the radially inward surface of the annular beam 36 where the flow front temperature is low enough to allow the tire material 45 to start to solidify (i.e., between 190° C. and 200° C.). The location of the weld lines 100 generally corresponds to failure locations. FEM results for pressure inside the mold 82 at the end of the injection for the center gating process (fill time of 6.6 seconds) are shown in FIG. 12, with the lowest pressures (between 10 and 15 Mpa) in the region of the mold cavity 84 where the annular beam 36 is.

Figure 13A:
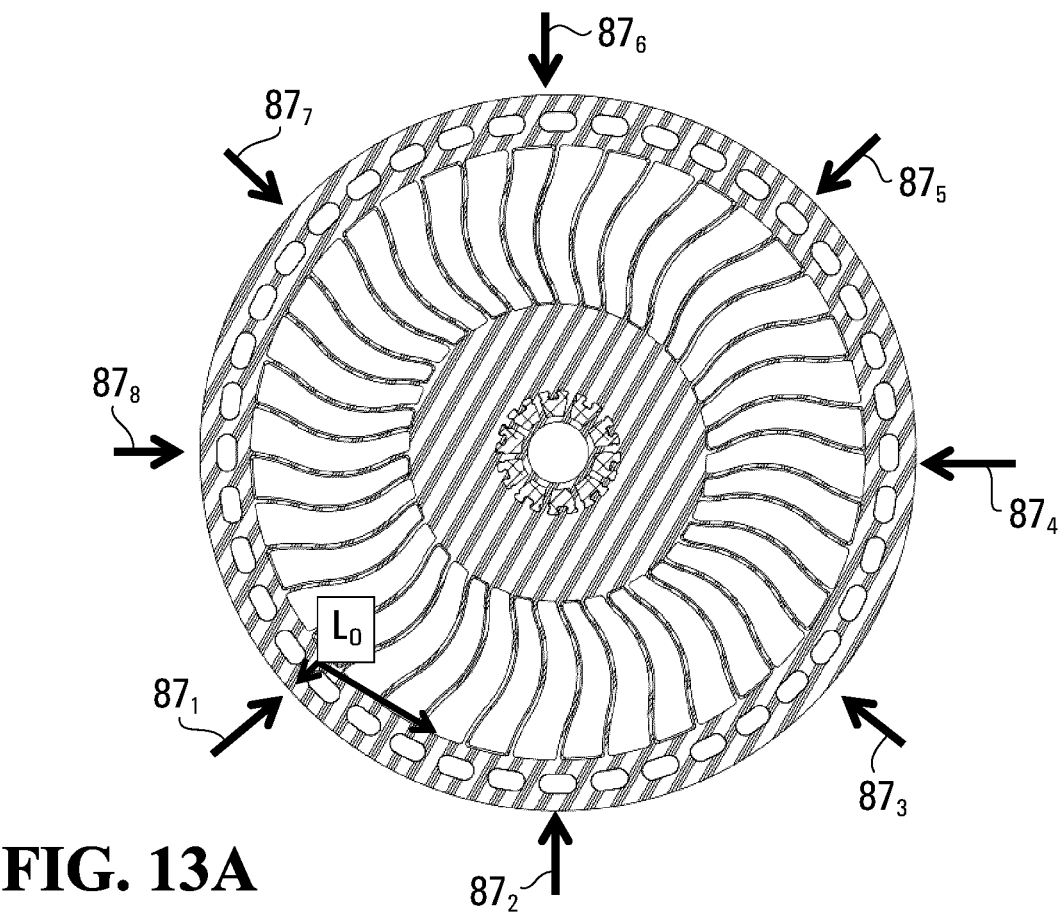
FIGS. 13A and 13B show a flow path in the outer gating thermoplastic injection process of FIG. 8.
Figure 13B:
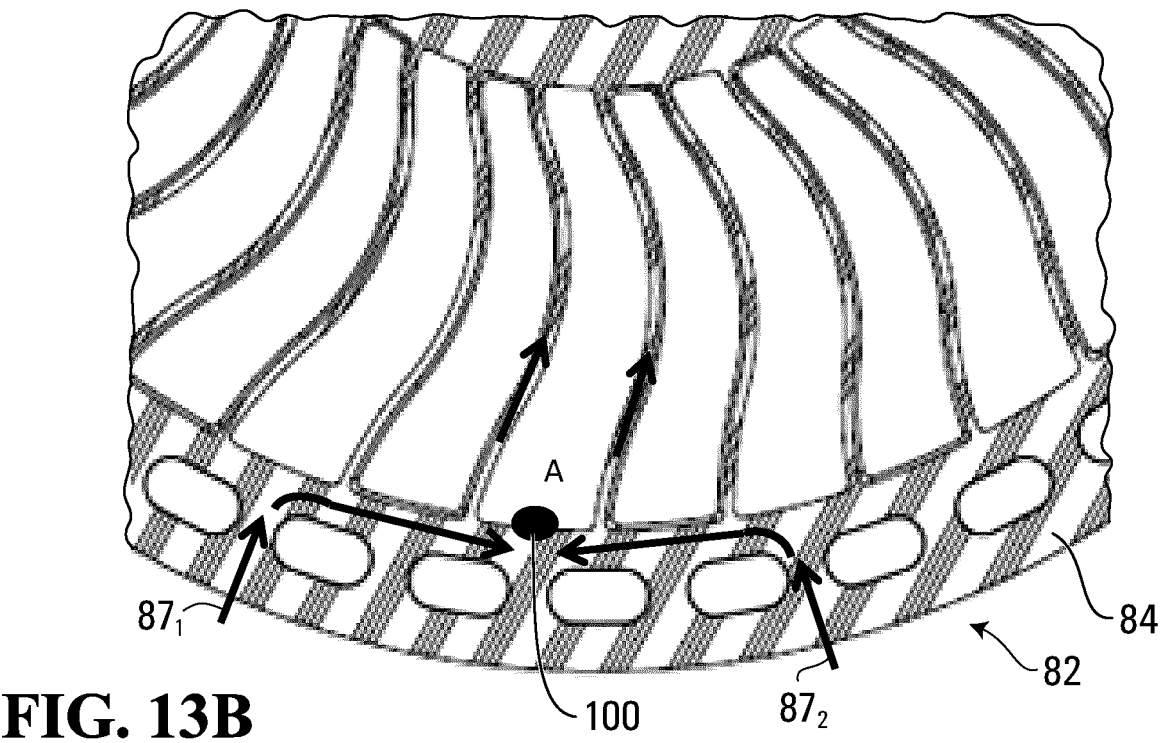

Material flow path for a tire manufactured with the outer gating process using the mold 82 of FIGS. 10A and 10B and the same tire material 45 (i.e., DuPont Hytrel 5526) is shown in FIGS. 13A and 13B. Using the outer gating process, the region of the mold 82 corresponding to the annular beam 36 fills first, and the regions of the mold 82 corresponding to the hub 32 fills last. In this configuration, the flow length $L_o$ shown corresponds to a distance between one of the plurality of injections gates and point A on FIG. 13B, i.e. a point on the inner circumferential extent of the annular beam 36 equidistant between the relevant one of the plurality of injections gates and a successive one of the plurality of injections gates. In this configuration, $L_o$=52 mm and $L_o < L_c$.

Figure 14:
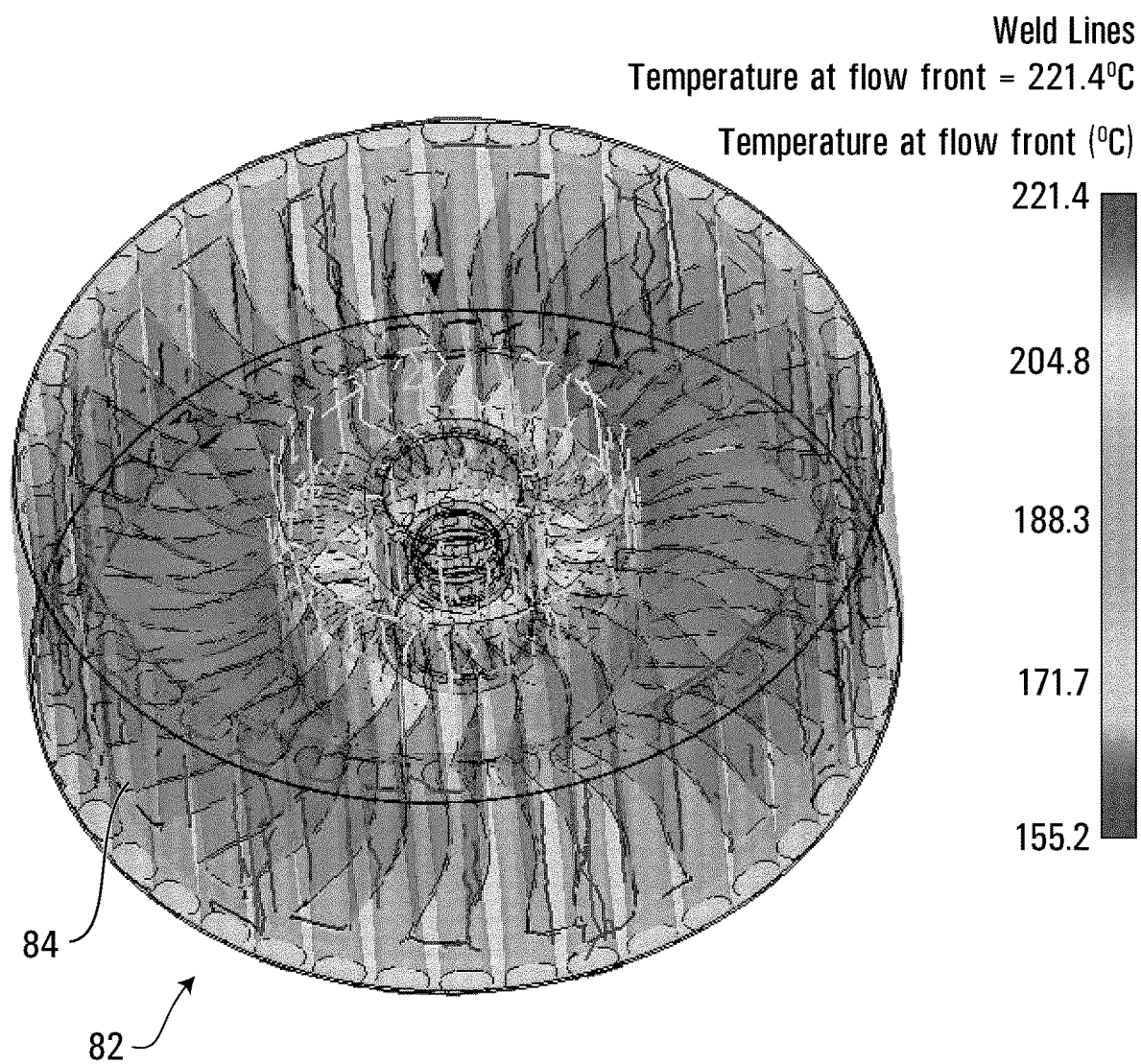
FIG. 14 shows FEM mold flow analysis results for a temperature of a material of the tire in the outer gating thermoplastic injection process of FIGS. 13A and 13B.
Figure 15:
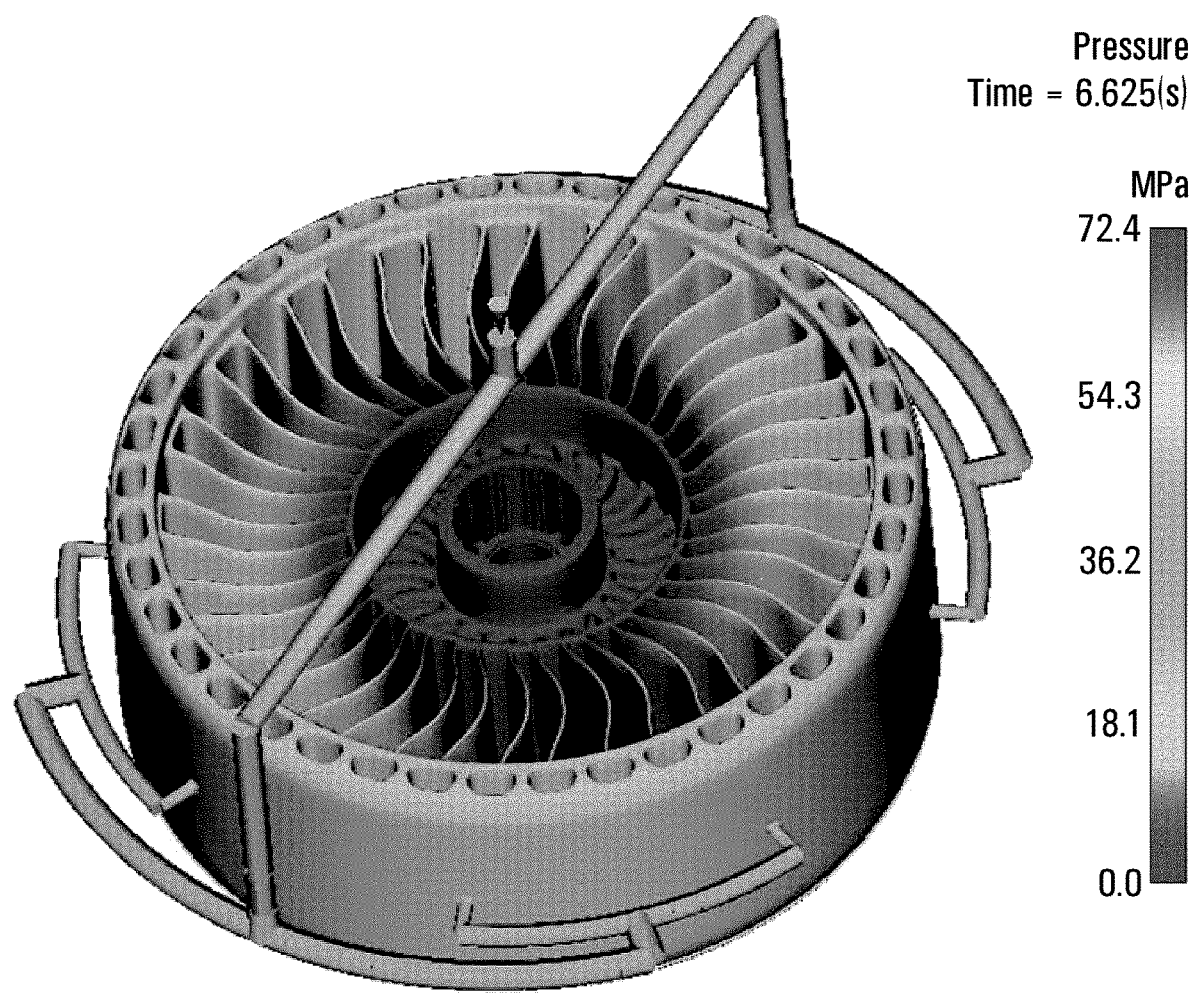
FIG. 15 shows FEM mold flow analysis results for pressure at end of injection in the outer gating thermoplastic injection process of FIGS. 13A and 13B.

FEM mold flow analysis for the outer gating process was performed using the conditions described above and using 8 injection points equally spaced around the outer radial extent of the annular beam 36. FEM results for flow front temperature of the tire material 45 in the outer gating process are shown in FIG. 14, with a predicted flow front temperature between 212° C. and 221° C. at the location of the weld lines 100. FEM results for pressure inside the mold 82 at the end of the injection for the outer getting process (fill time of 6.6 seconds) are shown in FIG. 15 with a predicted pressure between 21 and 27 MPa at the location of the weld lines 100.

Figure 16:
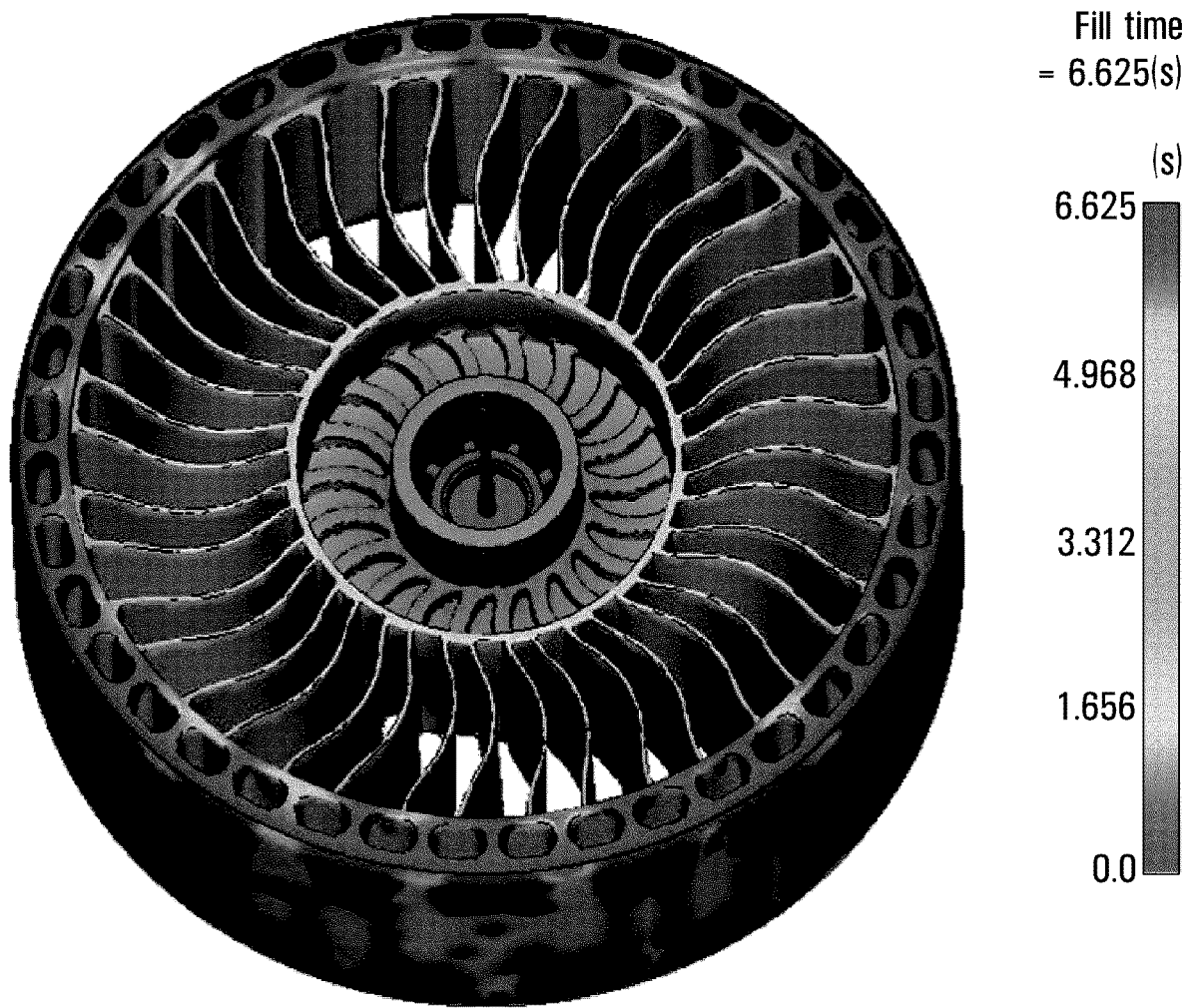
FIG. 16 shows FEM mold flow analysis results for mold fill times in the center gating thermoplastic injection process of FIGS. 10A and 10B.
Figure 17:
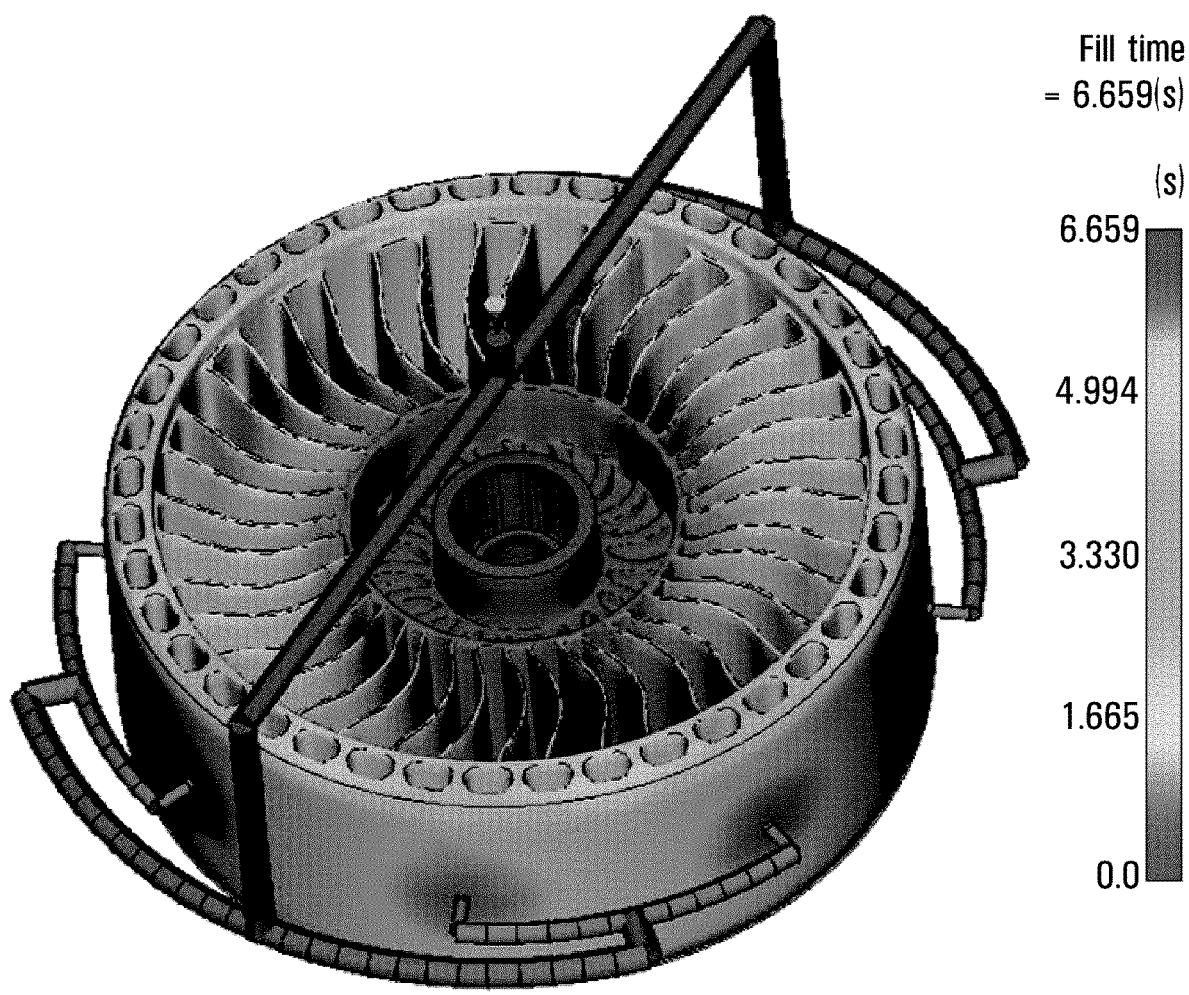
FIG. 17 shows FEM mold flow analysis results mold fill times in the outer gating thermoplastic injection process of FIGS. 13A and 13B.

Injection fill times for the center gating and outer gating processes above were also analyzed using FEM mold flow analysis, as shown in FIGS. 16 and 17, respectively, with a mold fill time of 6.6 seconds. For the center gating process, the time to fill the radially inner surface of the annular beam 36 is about 3.5 seconds while this time is about 1.6 seconds for the outer gating process. Therefore, in the center gating process, the lower flow front temperature and pressure at the radially inward surface of the annular beam 36 is at least a result the longer distance traveled by the tire material 45 and the longer injection time to reach the radially inward surface of the annular beam 36.

Tires were manufactured using the outer gating process as described above. At the design load of 120 kg, the tires did not exhibit failure for 20,000 km. Furthermore, at an overload condition of 166 kg, the tires went an additional 9,000 km, for a total of 29,000 km, thereby exceeding the specification of 20,000 km at a load of 120 kg.

To maximize a strength of the tire material 45 at the location of the weld lines 100 and minimize the risk of failures at the location of the weld lines 100, in this embodiment, the temperature of the tire material 45 at the location of the weld lines 100 during manufacture of the tire 34 should be at least 225° C., in some cases at least 220° C., in some cases at least 210° C., in some cases at least 200° C., in some cases at least 190° C. and in some cases even less. In parallel, in this embodiment, the pressure inside the mold 82 at the location of the weld lines 100 at the end of the injection should be at least 27 MPa, in some cases at least 25 MPa, in some cases at least 20 MPa, in some cases at least 15 MPa, in some cases at least 10 MPa and in some cases even less.

In some embodiments, the outer gating process as described above may help at least minimize (i.e., minimize or avoid) a loss of strength of the tire material 45 at the location of the weld lines 100 and therefore at least minimize (i.e., minimize or avoid) failures (i.e., cracks) or other issues affecting performance at the radially inward surface of the annular beam 36.

Figure 18:
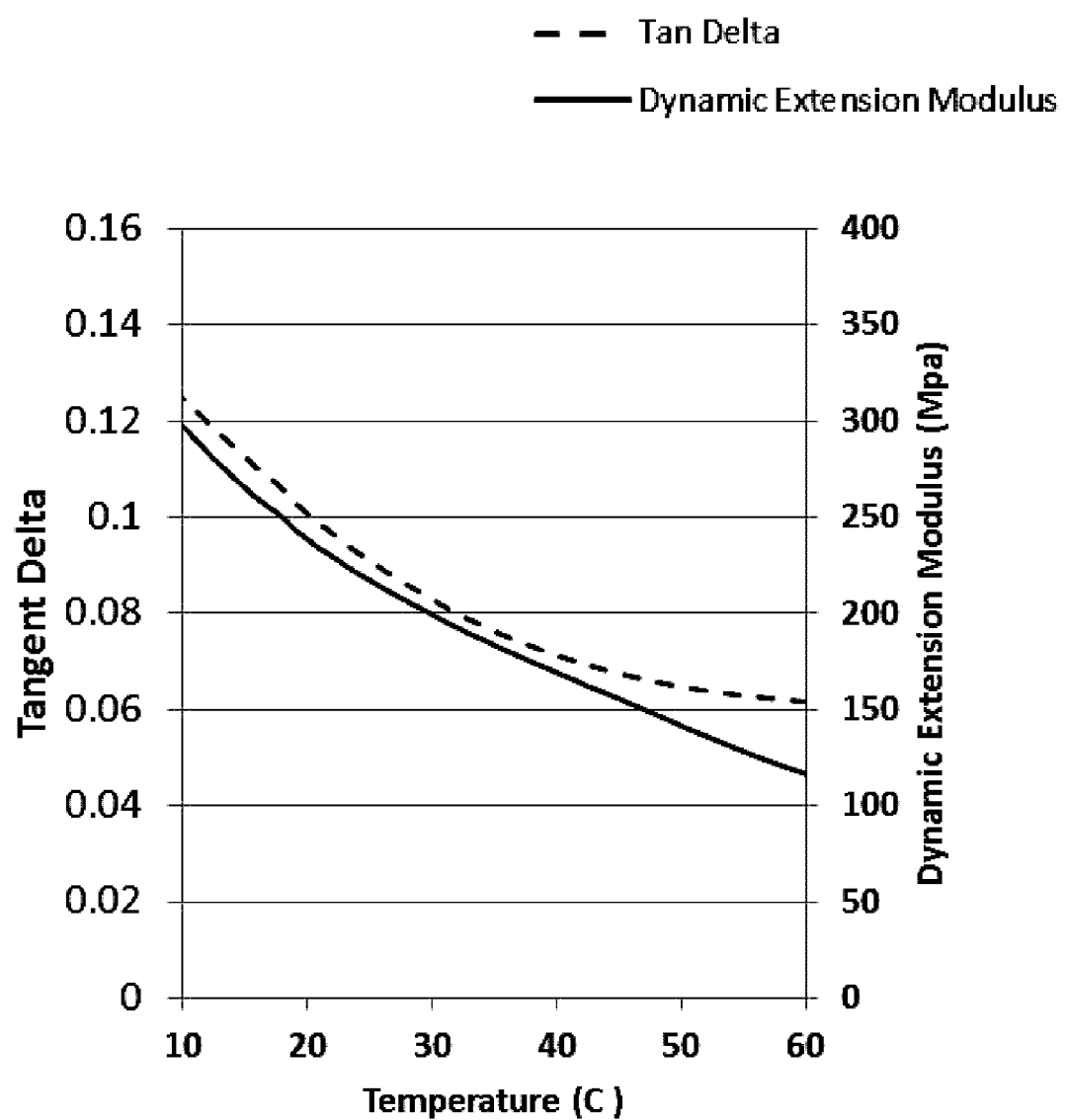
FIG. 18 shows a relation between dynamic extension modulus/tangent (delta) and temperature for an elastomeric material.

To achieve the above performance of tires manufactured using the outer gating process, the tire material 45 is Hytrel 5526 from DuPont, a thermoplastic elastomer, specifically a polyether-ester block co-polymer. With further reference to FIG. 18, for a range of temperature between 10° C. and 40° C., the tire material 45 has a dynamic extension modulus that is at least 120 MPa, in some cases at least 160 MPa, in some cases at least 200 MPa, and in some cases at least 240 MPa, in some cases at least 280 MPa, and in some cases even more. Also for the range of temperature between 10° C. and 40° C., the tire material 45 has a tan(delta) of no more than 0.12, in some cases no more than 0.1, in some cases no more than 0.08, in some cases no more than 0.06 and in some cases even less. The high modulus enables relatively thin walls to be used in the tire 34, yet still allow the tire 34 to carry the required load. The low tan(delta) minimizes heat buildup, working in concert with the high surface area to volume ratio of the tire 34, such as discussed in International Patent Application No. PCT/US2016/067260 and International Patent Application No. PCT/US2017/035008, which are hereby incorporated by reference herein.

For example, in some embodiments, a surface area S of the annular beam 36 and the annular support 41 may be significant in relation to a volume V of the annular beam 36 and the annular support 41 to help facilitate convective heat transfer away from the wheel $20_i$.

For instance, in some embodiments, a "volume-to-surface-area" ratio $R_{vs}$=V/S of the volume V of the annular beam 36 and the annular support 41 over the surface area S of the annular beam 36 and the annular support 41 may be relatively low. For example, in some embodiments, the volume-to-surface-area ratio $R_{vs}$ of the tire 34 may be no more than 2.0 mm$^3$/mm$^2$ and in some cases even less. The volume-to-surface-area ratio $R_{vs}$ of the tire 34 may have any other suitable value in other embodiments.

The dynamic modulus being approximately equal to Young's modulus, the tire material 45 has a Young's modulus of at least 90 MPa, in some cases at least 120 MPa, in some cases at least 150 MPa, in some cases at least 180 MPa, in some cases at least 210 MPa, some cases at least 240 MPa and in some cases even more. The tan(delta) should be no more than 0.10 at 20° C., and in some cases even less.

The tire material 45 also has very high crack propagation resistance. As disclosed in U.S. patent application Ser. No. 62/520,227, with further reference to FIG. 19, in some non-limiting embodiments the tire material 45 may exhibit a da/dN (i.e., a crack propagation rate in mm/cycle) of less than 1e-7 mm/cycle at a strain energy release rate of 3 N-mm/mm$^2$. For Elastomer A (i.e., Hytrel 5526), the extrapolated da/dN at a strain energy release rate of 3.5 N-mm/mm$^2$ is about 1.0e-7 mm/cycle.

Figure 19:
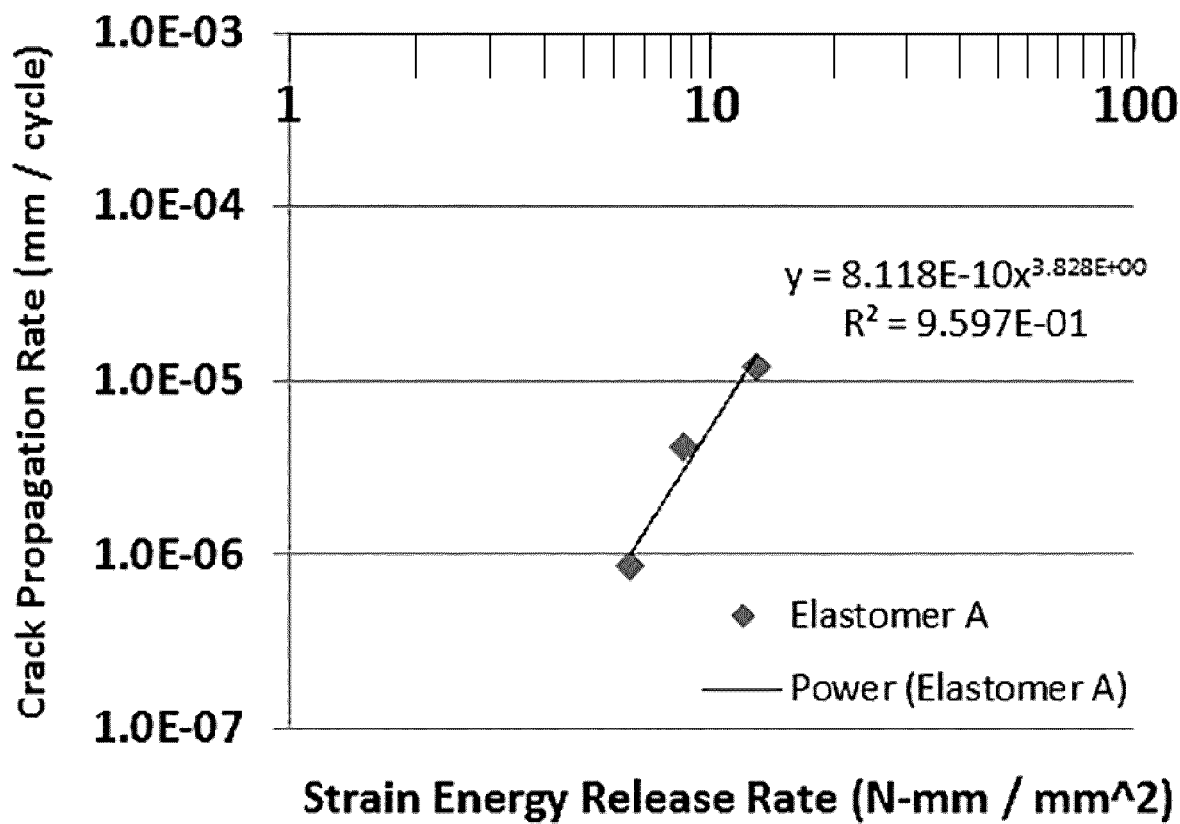
FIG. 19 shows a relation between a crack propagation rate and a strain energy release rate for an elastomeric material.

Using the outer gating process described above, the crack propagation performance of the tire material 45 as molded at the radially inner surface of the annular beam 36 approaches laboratory measurements as the ones shown in FIG. 19. Therefore, the actual crack propagation performance of the tire material 45 at the radially inner surface of the annular beam 36 may be approximately 1e-7 mm/cycle at a strain energy release rate of 3.5 N-mm/mm$^2$. Using the center gating process described above, the actual crack propagation rate of the tire material 45 at the radially inner surface of the annular beam 36 may increase (i.e., the crack propagation performance of the tire material 45 decreases) as a result of the presence of weld lines 100 formed at a temperature below 190° C. and a pressure below 10 MPa. Further, cracks may occur in the molded tire 34 made using the center gating process described above. As disclosed in U.S. patent application Ser. No. 62/520,227, the presence of an initial crack in a tensile strain field results in a high strain energy release rate which, in turn, results in a higher crack propagation rate. The combination of reduced strength, with the presence of initial cracks, accelerates fatigue failures in tires made using the center gating process.

It is appreciated that, in other embodiments, the outer gating process may be used with a plurality of tire materials. That is, in one embodiment, the hub material 72 may first be used in the outer gating process to make up at least a substantial part of the hub 32 and then the tire material 45 may be used to make up at least a substantial part of the annular support 41 and the annular beam 36. Any other combination and/or permutation and/or modification is possible in other embodiments. The caster wheel 20$i$ may also be manufactured with a tread 50 made of a material different from the tire material 45. The tread material has a Young's modulus lower than the Young's modulus of the tire material 45, that is no more than 30 MPa, in some cases no more than 15 MPa, in some cases no more than 5 MPa and in some cases even less. In yet further embodiments, outer gating and inner gating processes can be combined. For example, gate injections may be timed such that the outer gating process begins first and the inner gating process begins after the regions of the mold 82 corresponding to the annular support 41 and the annular beam 36 have been filled with the tire material 45. The inner gating process thereby complements the outer gating process by filling the region of the mold 82 corresponding to the hub 32 and minimizes the possible impact of weld lines in this region. A tread may be further added in a subsequent operation, as further discussed below.

Figure 20:
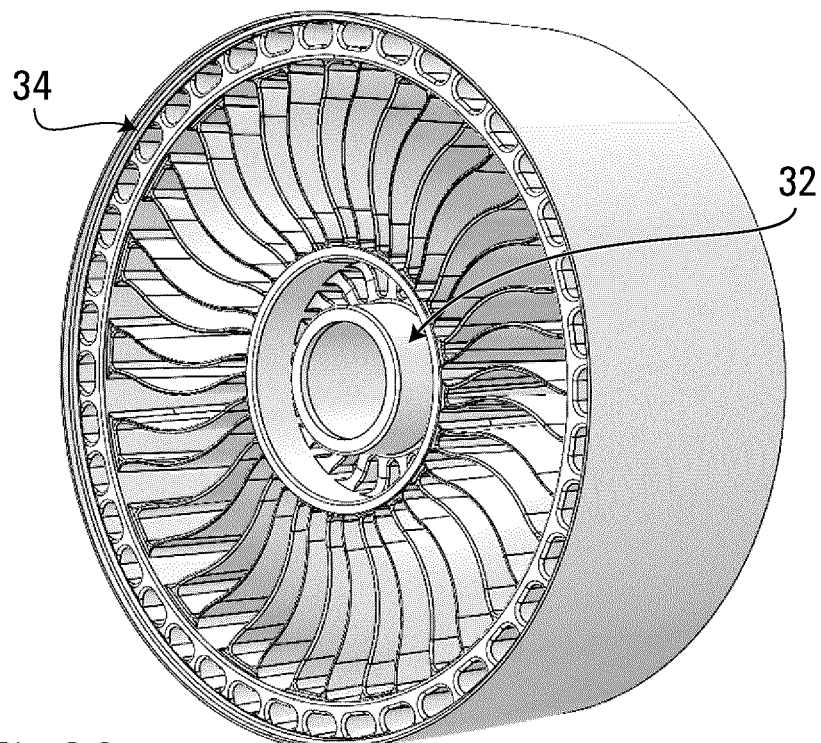
FIG. 20 shows an isometric view of a non-pneumatic tire without a tread.
Figure 21:
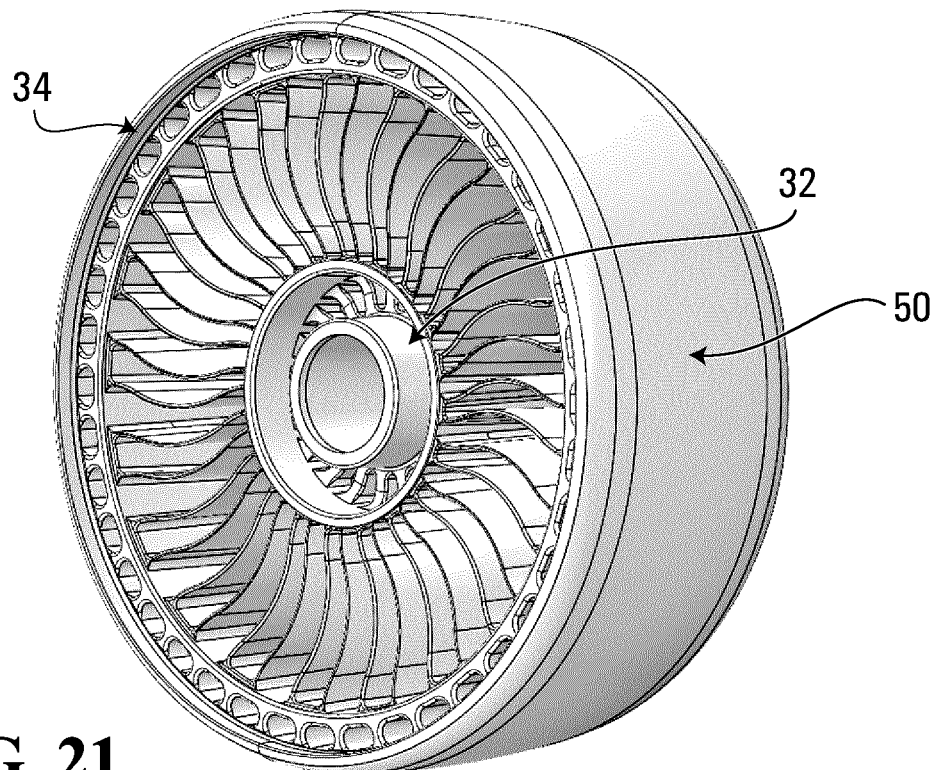
FIG. 21 shows an isometric view of the non-pneumatic tire of FIG. 20 with a tread.
Figure 22:
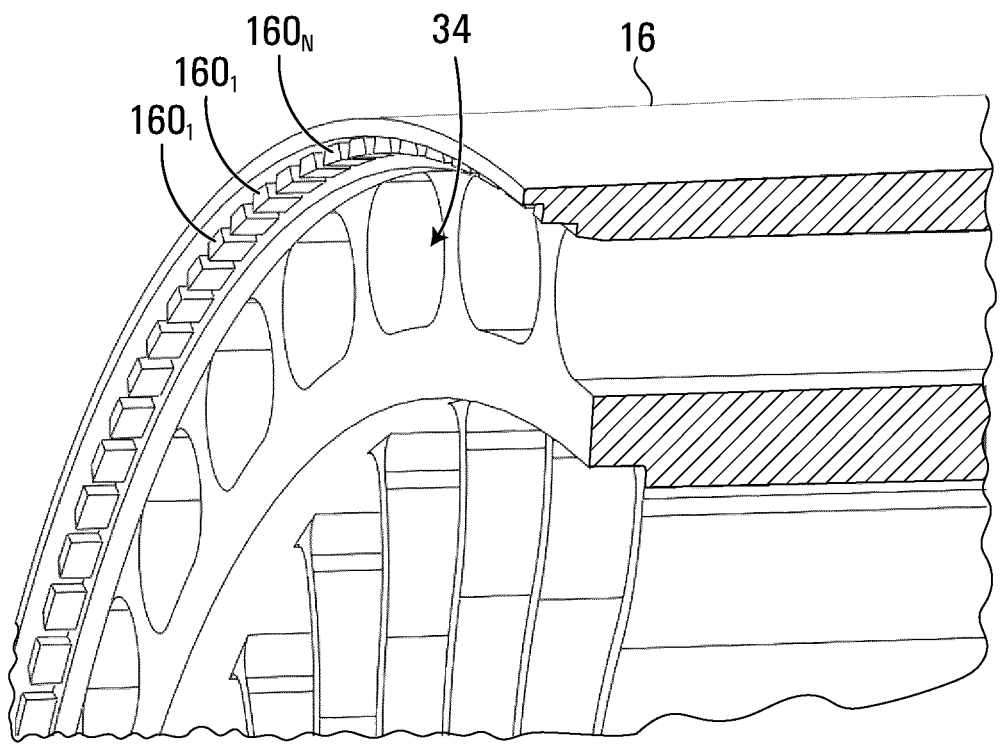
FIG. 22 shows an isometric view of a non-pneumatic tire comprising tread-engaging elements without a tread.

The tire 34 and the hub 32 as shown in FIGS. 20 and 22 may be specifically designed to facilitate a second thermoplastic molding operation, in which the tread material 72 is also thermoplastic and overmolded onto the tire 34 and the hub 32 as shown in FIG. 21. The outer peripheral extent 46 of the annular beam 36 may be designed such that it comprises a plurality of interlocking elements $160_1$-$160_n$. The plurality of interlocking elements $160_1$-$160_n$ provide a mechanical interlocking engagement with the tread 50 as the tread material flows around the plurality of interlocking elements $160_1$-$160_n$ during overmolding onto the tire 34 and the hub 32, thereby locking the tread 50 in place after solidification.

Figure 23:
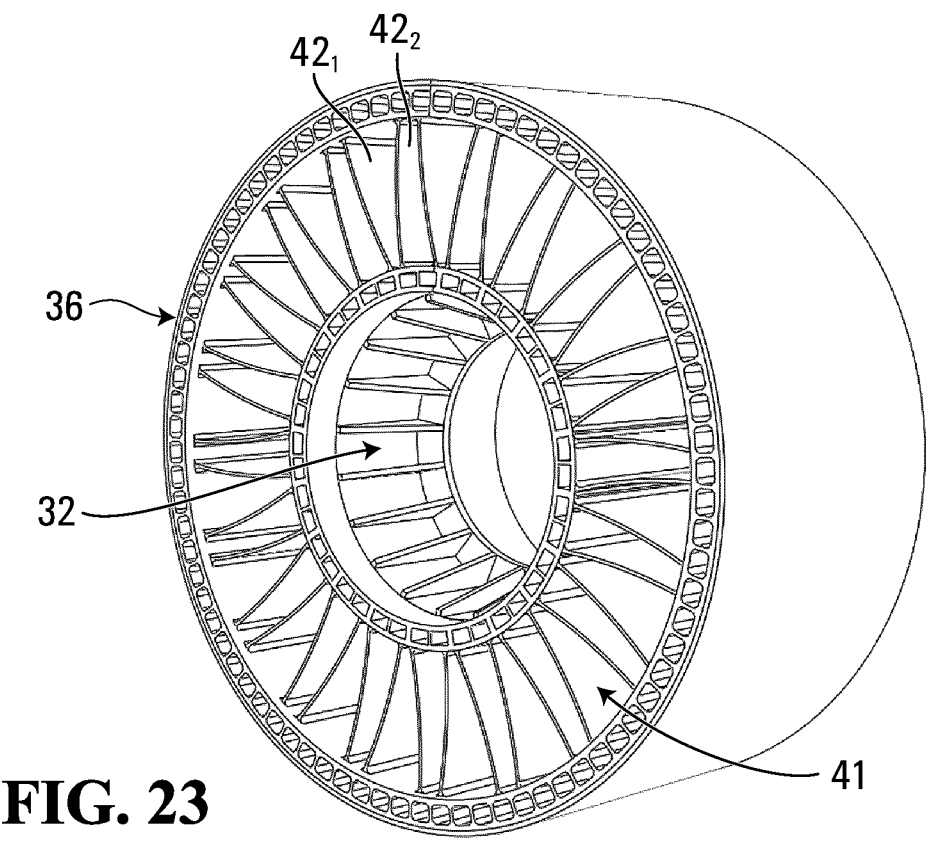
FIG. 23 shows an isometric view of a non-pneumatic tire of size 24"×12" without a tread.

With further reference to FIG. 23, a rear zero-turn-radius (ZTR) tire without a tread is shown, with a weight of the tire 34 and the hub 32 being about 31 lbs (14 kg). In this embodiment, the annular beam 36 and the spokes $42_1$-$42_T$ of the tire 34 and the hub 32 are entirely elastomeric and made of the same elastomeric material using injection molding as described above.

Although in embodiments considered above the vehicle 10 is a lawn mower, a caster wheel constructed according to principles discussed herein may be used as part of other vehicles or other devices in other embodiments. For example, in some embodiments, a caster wheel constructed according to principles discussed herein may be part of a work implement, such as rotary cutter, sometimes referred to as a "brush" hog or "bush hog", that is attachable to a back of a tractor or other vehicle (e.g., using a three-point hitch and powered via a power take-off) to cut or perform other work on the ground.

While in embodiments considered above the wheel 201 is a caster wheel, the wheel 201 may be any other type of wheel in other embodiments.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but is not limiting. Various modifications and enhancements will become apparent to those of ordinary skill in the art.

The invention claimed is:

1. A non-pneumatic tire comprising:
   an annular beam configured to deflect at a contact patch of the non-pneumatic tire as the non-pneumatic tire rolls on a ground surface; and an annular support extending radially inwardly from the annular beam and configured to deform as the non-pneumatic tire rolls on the ground surface;

wherein the annular beam and the annular support are injection molded together from a thermoplastic elastomeric material flowing where at least part of the annular beam is before flowing where at least part of the annular support is, wherein the annular beam and the annular support are injection molded together using a mold comprising outer gating at a radially outer peripheral surface of the mold to inject the thermoplastic elastomeric material into the mold adjacent to where at least part of the annular beam is to be formed, and wherein the outer gating comprises a plurality of outer gates at the radially outer peripheral surface to inject respective portions of the thermoplastic elastomeric material.

2. The non-pneumatic tire of claim 1, wherein the outer gates are evenly distributed around the mold.

3. The non-pneumatic tire of claim 1, wherein the annular support comprises a plurality of spokes.

4. The non-pneumatic tire of claim 1, wherein a plurality of weld lines where at least part of the annular beam is formed at a temperature of at least 190° C.

5. The non-pneumatic tire of claim 1, wherein a plurality of weld lines where at least part of the annular beam is formed with a final injection pressure of at least 10 MPa.

6. The non-pneumatic tire of claim 1, wherein the annular beam is configured to deflect more by shearing than by bending at the contact patch of the non-pneumatic tire.

7. The non-pneumatic tire of claim 6, wherein a ratio of a transverse deflection of the annular beam due to shear over a transverse deflection of the annular beam due to bending at a center of a design contact length at the contact patch of the non-pneumatic tire is at least 1.2 when the ground surface is substantially flat.

8. The non-pneumatic tire of claim 7, wherein the ratio of the transverse deflection of the annular beam due to shear over the transverse deflection of the annular beam due to bending at the center of the design contact length at the contact patch of the non-pneumatic tire is at least 2 when the ground surface is substantially flat.

9. The non-pneumatic tire of claim 1, wherein the annular beam comprises:

an outer annular portion, an inner annular portion, and a shearing annular portion between the outer annular portion and the inner annular portion of the annular beam;

the outer annular portion, the inner annular portion, and the shearing annular portion of the annular beam are elastomeric; and at least one of the outer annular portion and the inner annular portion of the annular beam is free of substantially inextensible reinforcement running in a circumferential direction of the annular beam.

10. The non-pneumatic tire of claim 9, wherein each of the outer annular portion and the inner annular portion of the annular beam is free of substantially inextensible reinforcement running in the circumferential direction of the annular beam.

11. The non-pneumatic tire of claim 9, wherein the shearing annular portion of the annular beam is shaped to cause the annular beam to deflect more by shearing than by bending at the contact patch of the non-pneumatic tire.

12. The non-pneumatic tire of claim 11, wherein the shearing annular portion of the annular beam comprises a plurality of formations distributed in the circumferential direction of the annular beam and arranged to cause the annular beam to deflect more by shearing than by bending at the contact patch of the non-pneumatic tire.

13. The non-pneumatic tire of claim 12, wherein the formations comprise voids.

14. The non-pneumatic tire of claim 13, wherein each of the voids extends from a first lateral side of the annular beam to a second lateral side of the annular beam opposite to the first lateral side of the annular beam.

15. The non-pneumatic tire of claim 12, wherein the shearing annular portion of the annular beam comprises a plurality of shearing members interconnecting the outer annular portion and the inner annular portion of the annular beam and spaced apart from one another in the circumferential direction of the annular beam.

16. The non-pneumatic tire of claim 15, wherein a dimension of each of the shearing members in the circumferential direction of the annular beam is greater than a thickness of a given one of the outer annular portion and the inner annular portion of the annular beam.

17. The non-pneumatic tire of claim 1, wherein a Young's modulus of the thermoplastic elastomeric material is at least a plurality of times a secant modulus at 100% elongation of the thermoplastic elastomeric material.

18. The non-pneumatic tire of claim 17 wherein the Young's modulus of the thermoplastic elastomeric material is at least four times the secant modulus at 100% elongation of the thermoplastic elastomeric material.

19. The non-pneumatic tire of claim 18, wherein the Young's modulus of the thermoplastic elastomeric material is at least ten times the secant modulus at 100% elongation of the thermoplastic elastomeric material.

20. The non-pneumatic tire of claim 1, wherein a Young's modulus of the thermoplastic elastomeric material is no more than 350 MPa.

21. The non-pneumatic tire of claim 20, wherein the Young's modulus of the thermoplastic elastomeric material is at least 90 MPa.

22. The non-pneumatic tire of claim 21, wherein the Young's modulus of the thermoplastic elastomeric material is at least 130 MPa.

23. The non-pneumatic tire of claim 1, wherein a tan (delta) of the thermoplastic elastomeric material is no more than 0.12 for a temperature between 10° C. and 40° C.

24. The non-pneumatic tire of claim 23, wherein the tan(delta) of the thermoplastic elastomeric material is no more than 0.1 for a temperature between 10° C. and 40° C.

25. The non-pneumatic tire of claim 24, wherein the tan(delta) of the thermoplastic elastomeric material is no more than 0.08 for a temperature between 10° C. and 40° C.

26. The non-pneumatic tire of claim 25, wherein the tan(delta) of the thermoplastic elastomeric material is no more than 0.07 for a temperature between 10° C. and 40° C.

27. The non-pneumatic tire of claim 1, wherein the thermoplastic elastomeric material of the annular beam has a crack propagation rate of no more than $1e^{-7}$ mm/cycle at a strain energy release rate of 3 N-mm/mm$^2$.

28. The non-pneumatic tire of claim 1, wherein the annular support is deformable such that, when the non-pneumatic tire is loaded, an upper portion of the annular support above an axis of rotation of the non-pneumatic tire is in tension.

29. The non-pneumatic tire of claim 1, wherein the annular support comprises a plurality of spokes deformable such that, when the non-pneumatic tire is loaded, upper ones of the spokes located above an axis of rotation of the non-pneumatic tire are in tension.

30. The non-pneumatic tire of claim 1, wherein the non-pneumatic tire comprises a tread disposed radially outwardly of the annular beam.

31. A wheel comprising the non-pneumatic tire of claim 1 and a hub extending radially inwardly from the annular support towards an axis of rotation of the wheel.

32. The wheel of claim 31, wherein at least part of the annular support is injection molded from thermoplastic elastomeric material flowing where at least part of the hub is before flowing where at least part the annular support is.

33. The wheel of claim 31, wherein the annular beam, the annular support and the hub are injection molded together.

34. The wheel of claim 33, wherein the annular beam, the annular support and the hub are injection molded together from thermoplastic elastomeric material flowing where the at least part of the annular beam is before flowing where at least part of the annular support is and before flowing where at least part of the hub is.

35. A non-pneumatic tire comprising:
an annular beam configured to deflect at a contact patch of the non-pneumatic tire as the non-pneumatic tire rolls on a ground surface; and
an annular support extending radially inwardly from the annular beam and configured to deform as the non-pneumatic tire rolls on the ground surface;
wherein the annular beam and the annular support are injection molded together using a mold comprising outer gating to inject thermoplastic elastomeric material into the mold adjacent to where the annular beam is to be formed,
wherein the outer gating comprises a plurality of outer gates at a radially outer peripheral surface of the mold to inject respective portions of the thermoplastic elastomeric material.

36. A non-pneumatic tire comprising:
an annular beam configured to deflect at a contact patch of the non-pneumatic tire as the non-pneumatic tire rolls on a ground surface; and
an annular support extending radially inwardly from the annular beam and configured to deform as the non-pneumatic tire rolls on the ground surface;
wherein a radially outer peripheral surface of the annular beam contains a plurality of injection-molding-gate marks.

* * * * *